(12) United States Patent
Wei et al.

(10) Patent No.: US 12,311,338 B2
(45) Date of Patent: May 27, 2025

(54) LOW TEMPERATURE NOx ADSORBER WITH ENHANCED HYDROTHERMAL STABILITY

(71) Applicant: BASF MOBILE EMISSIONS CATALYSTS LLC, Iselin, NJ (US)

(72) Inventors: Xinyi Wei, Princeton, NJ (US); Xiaoming Xu, Edison, NJ (US); Evan Vincent Miu, Chester, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 812 days.

(21) Appl. No.: 17/608,174

(22) PCT Filed: May 7, 2020

(86) PCT No.: PCT/US2020/031744
§ 371 (c)(1),
(2) Date: Nov. 2, 2021

(87) PCT Pub. No.: WO2020/227455
PCT Pub. Date: Nov. 12, 2020

(65) Prior Publication Data
US 2022/0212162 A1 Jul. 7, 2022

Related U.S. Application Data

(60) Provisional application No. 62/845,359, filed on May 9, 2019.

(51) Int. Cl.
*B01J 20/18* (2006.01)
*B01D 53/94* (2006.01)
(Continued)

(52) U.S. Cl.
CPC ........ *B01J 20/186* (2013.01); *B01D 53/9422* (2013.01); *B01D 53/944* (2013.01);
(Continued)

(58) Field of Classification Search
CPC ...... B01J 20/186; B01J 20/3238; B01J 29/67; B01J 29/7415; B01J 20/28045;
(Continued)

(56) References Cited

U.S. PATENT DOCUMENTS 4,961,917 A 10/1990 Byrne
5,516,497 A 5/1996 Speronello et al.
(Continued)

FOREIGN PATENT DOCUMENTS

EP 3792460 A1 3/2021
JP 5875586 B2 3/2016
(Continued)

OTHER PUBLICATIONS

Machine Translation of JP 2017070901A (Year: 2017).*
(Continued)

*Primary Examiner* — Brandon D Lee
(74) *Attorney, Agent, or Firm* — DLA Piper LLP (US)

(57) ABSTRACT

The present disclosure is directed to Low Temperature NOx-Absorber (LT-NA) catalyst compositions, catalyst articles, and an emission treatment system for treating an exhaust gas, each including the LT-NA catalyst compositions. Further provided are methods for reducing a $NO_x$ level in an exhaust gas stream using the catalyst article. In particular, the LT-NA compositions include a zeolite containing a first metal component including palladium and a second metal component which is an alkaline earth metal component, an oxide of an alkaline earth metal component, a rare earth metal component, an oxide of a rare earth metal component, or a combination thereof. The LT-NA compositions exhibit increased low temperature $NO_x$ adsorption capacity and enhanced hydrothermal stability.

23 Claims, 13 Drawing Sheets

(51) Int. Cl.
    *B01J 20/32*     (2006.01)
    *B01J 29/67*     (2006.01)
    *B01J 29/74*     (2006.01)
    *F01N 3/08*     (2006.01)

(52) U.S. Cl.
    CPC ........... *B01J 20/3238* (2013.01); *B01J 29/67* (2013.01); *B01J 29/7415* (2013.01); *F01N 3/0814* (2013.01); *F01N 3/0842* (2013.01); *B01D 2253/1085* (2013.01); *B01D 2253/3425* (2013.01); *B01D 2255/1021* (2013.01); *B01D 2255/1023* (2013.01); *B01D 2255/206* (2013.01); *B01D 2257/404* (2013.01); *B01D 2258/012* (2013.01); *F01N 2370/04* (2013.01); *F01N 2370/24* (2013.01)

(58) Field of Classification Search
    CPC .... B01J 23/44; B01D 53/9422; B01D 53/944; B01D 2253/1085; B01D 2253/3425; B01D 2255/1021; B01D 2255/1023; B01D 2255/206; B01D 2257/404; B01D 2258/012; B01D 53/9468; B01D 53/9477; B01D 53/9481; B01D 2253/108; B01D 2255/204; B01D 2258/01; F01N 3/0814; F01N 3/0842; F01N 2370/04; F01N 2370/24; F01N 2510/063; F01N 2510/0682; F01N 2510/0684; F01N 3/033
    See application file for complete search history.

(56) References Cited

U.S. PATENT DOCUMENTS

| | | | |
|---|---|---|---|
| 7,229,597 | B2 | 6/2007 | Patchett et al. |
| 8,753,596 | B2 | 6/2014 | Spurk et al. |
| 2013/0156668 | A1 | 6/2013 | Spurk et al. |
| 2015/0202572 | A1* | 7/2015 | Chiffey ................... B01J 23/42 502/241 |
| 2017/0096923 | A1* | 4/2017 | Chiffey ................... B01J 35/56 |
| 2018/0029016 | A1 | 2/2018 | Sung et al. |
| 2018/0085707 | A1 | 3/2018 | Feaviour |
| 2018/0257062 | A1 | 9/2018 | Chiffey et al. |

FOREIGN PATENT DOCUMENTS

| | | | |
|---|---|---|---|
| JP | 2017070901 A | * | 4/2017 |
| KR | 10-2019-0032168 A | | 3/2019 |
| WO | 2016/070090 A1 | | 5/2016 |

OTHER PUBLICATIONS

Chauhan, et al., "Synthesis of zeolite ferrierite—Role of emulsifiers", Indian Journal of Chemical Technology, vol. 18, Issue 5, Sep. 2011, pp. 335-342.

Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.

International Search Report for PCT Patent Application No. PCT/US2020/031744, Issued on Aug. 7, 2020, 4 pages.

Pinar, et al., "Tuning acid sites distribution of zeolite ferrierite and impact on its catalytic performance", Proceedings of the 5th Serbian-Croatian-Slovenian Symposium on Zeolites, 2013, pp. 32-35.

Rakoczy, et al., "Template-Free Synthesis of Zeolite Ferrierite and Characterization of its Acid Sites", Chemical Engineering & Technology, vol. 25, Issue 3, Mar. 7, 2002, pp. 273-275.

* cited by examiner

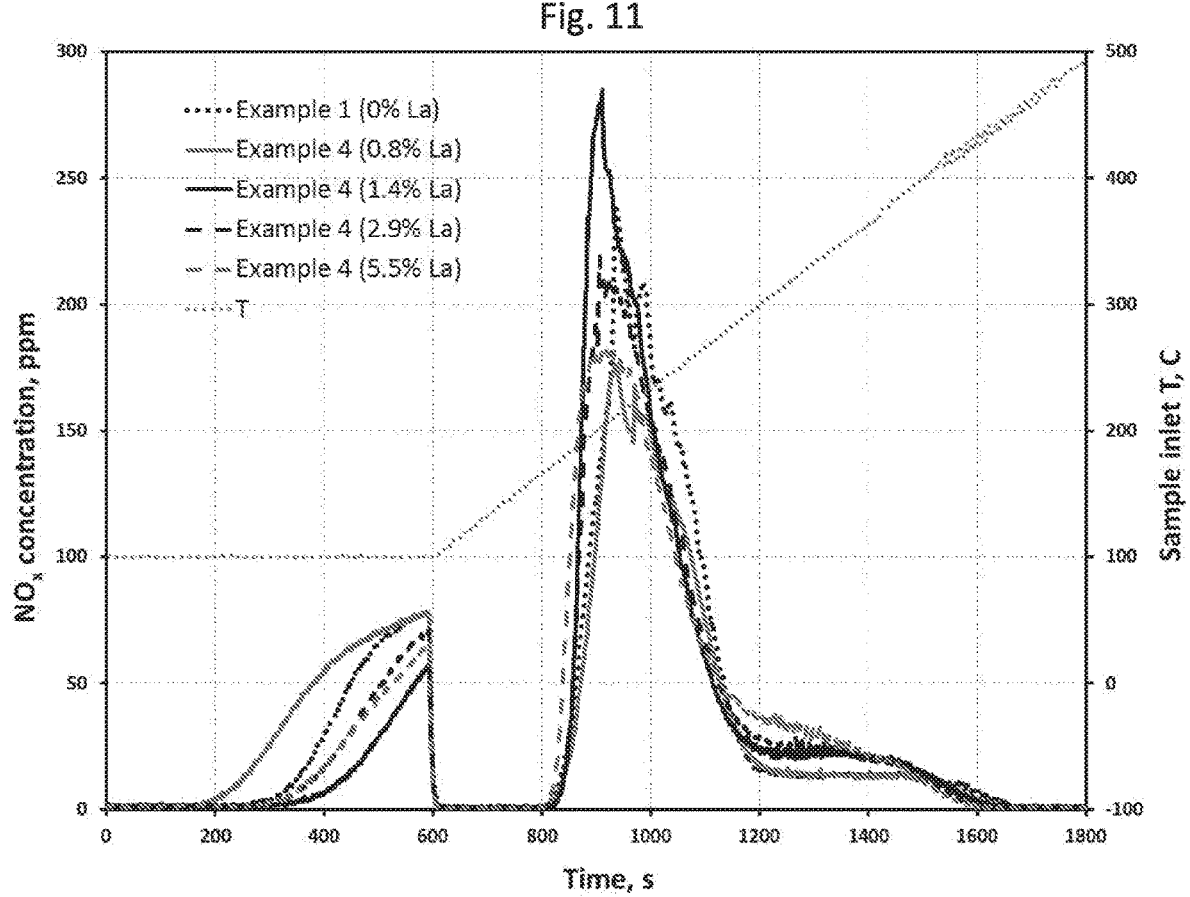

LOW TEMPERATURE NOx ADSORBER WITH ENHANCED HYDROTHERMAL STABILITY

CROSS-REFERENCE TO RELATED APPLICATIONS

This application is a national stage of PCT/US2020/031744, filed May 7, 2020, which claims the benefit of priority to U.S. Provisional Application No. 62/845,359, filed May 9, 2019, the contents of which are hereby incorporated by reference in their entirety.

FIELD OF THE INVENTION

The present invention is directed to compositions, articles, systems, and methods suitable for treating exhaust gas streams of lean burn internal combustion engines to reduce emissions of nitrogen oxides ($NO_x$).

BACKGROUND OF THE INVENTION

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. $NO_x$ are harmful components of atmospheric pollution. Various methods have been used for the treatment of $NO_x$-containing gas mixtures to decrease atmospheric pollution.

An effective method to reduce $NO_x$ from the exhaust of lean-burn engines requires reaction of $NO_x$ under lean burn engine operating conditions with a suitable reductant in the presence of a selective catalytic reduction (SCR) catalyst component. The SCR process typically uses as the reductant ammonia or a hydrocarbon in the presence of atmospheric oxygen, resulting in the formation predominantly of nitrogen and steam:

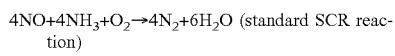
$4NO+4NH_3+O_2 \rightarrow 4N_2+6H_2O$ (standard SCR reaction)

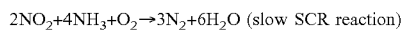
$2NO_2+4NH_3+O_2 \rightarrow 3N_2+6H_2O$ (slow SCR reaction)

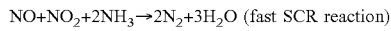
$NO+NO_2+2NH_3 \rightarrow 2N_2+3H_2O$ (fast SCR reaction)

Current catalysts employed in the SCR process include molecular sieves, such as zeolites, ion-exchanged with a catalytic metal such as iron or copper. A useful SCR catalyst component is able to effectively catalyze the reduction of the $NO_x$ exhaust component at temperatures below 600° C. so that reduced $NO_x$ levels can be achieved even under conditions of low load, which typically are associated with lower exhaust temperatures.

A major problem encountered in the treatment of automotive exhaust gas streams is the so-called "cold start" period, which is the time period at the beginning of the treatment process, when the exhaust gas stream and the exhaust gas treatment system are at low temperatures (i.e., below 150° C.). At these low temperatures, exhaust gas treatment systems generally do not display sufficient catalytic activity for effectively treating hydrocarbons (HC), nitrogen oxides ($NO_x$) and/or carbon monoxide (CO) emissions. In general, catalytic components such as SCR catalyst components are very effective in converting $NO_x$ to $N_2$ at temperatures above 200° C. but do not exhibit sufficient activities at lower temperature regions (<200° C.) such as those found during cold-start or prolonged low-speed city driving. Employing a catalyst that is functional during low temperature operation (<150° C.) can help to meet these increasingly tighter emissions regulations (e.g., Euro-7 regulations). As >80% of cold-start $NO_x$ emission consists of NO, it is imperative that such advanced $NO_x$ adsorption materials have great efficiency for NO adsorption. Therefore, components capable of capturing and storing such low-temperature $NO_x$ emissions, and being able to release it at higher temperatures (>200° C.) when downstream catalytic components (e.g., SCR catalyst components) become effective are in great demand. As a result, considerable efforts have been made to alleviate this problem.

There are several ways to minimize $NO_x$ emissions during cold-start periods. For instance, trapping systems have been developed which can store these exhaust gas emissions (i.e., HC, CO and $NO_x$ gases) at low temperatures and subsequently release them at higher temperatures, when the remaining catalytic components of the treatment system have attained sufficient catalytic activity. One such system is the Lean $NO_x$ Trap (LNT) catalyst, a well-known and commercially proven technology. LNT catalysts contain $NO_x$ adsorbent components that trap $NO_x$ under certain exhaust conditions. For example, the $NO_x$ adsorbent components can comprise alkaline earth elements, e.g., including alkaline earth metal oxides and carbonates, such as oxides of Mg, Ca, Sr, and/or Ba. Other LNT catalysts can contain rare earth metal oxides as $NO_x$ adsorbent components, such as oxides of Ce, La, Pr, and/or Nd. LNT catalysts further contain a platinum group metal component (PGM) such as platinum dispersed on a refractory metal oxide (e.g., alumina) support for catalytic $NO_x$ oxidation and reduction. The LNT catalyst operates under cyclic lean (trapping mode) and rich (regeneration mode) exhaust conditions. Under lean conditions, the LNT catalyst traps and stores $NO_x$ as an inorganic nitrate (for example, where the $NO_x$ adsorbent component is BaO or $BaCO_3$, it is converted to $Ba(NO_3)_2$ upon reaction with ("trapping") of $NO_x$. The $NO_x$ adsorbent component then releases the trapped $NO_x$ and the PGM component reduces the $NO_x$ to $N_2$ under stoichiometric or transient rich engine operating conditions, or under lean engine operation with external fuel injected in the exhaust to induce rich conditions. NO to $NO_2$ conversion is a prerequisite to efficient $NO_x$ trapping; however the reaction rate is very slow when temperature is below 200° C., which renders the traditional LNT catalyst inefficient for trapping of cold-start $NO_x$ emission. Further, a rich purge is required to regenerate the LNT catalyst, which reduces fuel economy, however minimally. Therefore, a preferred solution would be to have a $NO_x$ absorption/release component that operates under lean conditions only.

Another type of $NO_x$ adsorber is the Low-Temperature $NO_x$ Adsorber (LT-NA), which predominantly uses ion-exchanged Pd in zeolites as the $NO_x$ adsorbent. In this case, the $NO_x$ adsorption and desorption properties are strongly dependent on the type of zeolite. Accordingly, LT-NAs having hydrothermal stability, enhanced adsorption capacity, and a $NO_x$ desorption profile optimized to meet requirements of specific engine applications are highly desirable.

SUMMARY OF THE INVENTION

The present disclosure generally provides compositions, articles, and exhaust treatment systems comprising such articles which exhibit enhanced $NO_x$ adsorption under low temperature conditions. In particular, such compositions, articles and systems comprise a $NO_x$ adsorber suitable for adsorbing $NO_x$ at low temperatures and releasing trapped $NO_x$ at elevated temperatures (>200° C.) when downstream catalytic components (i.e. SCR catalysts) become effective. The $NO_x$ adsorption compositions of the present disclosure provide desirable $NO_x$ adsorption and desorption properties under various engine operating conditions.

Surprisingly, according to the present disclosure, it has been found that doping palladium ion-exchanged zeolites with certain metal components or metal oxides leads to LT-NA compositions with enhanced cold-start $NO_x$ adsorption capacity after hydrothermal aging, a higher $NO_x$ desorption temperature range, and, when combined with a diesel oxidation catalyst (DOC) composition, enhanced carbon monoxide (CO) and hydrocarbon (HC) conversion relative to LT-NA compositions which do not contain such metal components.

Accordingly, in one aspect is provided a Low Temperature $NO_x$ Adsorber (LT-NA) composition comprising a zeolite having at least a first metal component and a second metal component included therewith, wherein the first metal component includes palladium, and wherein the second metal component is selected from the group consisting of an alkaline earth metal component, an oxide of an alkaline earth metal component, a rare earth metal component, an oxide of a rare earth metal component, and combinations thereof.

In some embodiments, the second metal component is an alkaline earth metal component or an oxide of an alkaline earth metal component. In some embodiments, the alkaline earth metal component comprises magnesium, calcium, strontium, barium, an oxide of magnesium, calcium, strontium, barium, or a combination thereof. In some embodiments, the second metal component is a rare earth metal component or an oxide of a rare earth metal component. In some embodiments, the rare earth metal component comprises Ce, La, Pr, Nd, Pm, Sm, Eu, Gd, Tb, Dy, Ho, Er, Tm, Yb, Lu, or an oxide of Ce, La, Pr, Nd, Pm, Sm, Eu, Gd, Tb, Dy, Ho, Er, Tm, Yb, or Lu, or a combination thereof.

In some embodiments, at least a portion of the palladium is ion-exchanged in the zeolite. In some embodiments, the palladium is present in an amount of about 0.01% to about 10% by weight, based on the weight of the zeolite, and calculated as elemental palladium.

In some embodiments, the second metal component is present in a ratio by weight to the first metal component of from about 0.1 to about 2, calculated as the metal for the second metal component.

In some embodiments, the second metal component is present in an amount by weight of from about 0.10% to about 10%, based on the total weight of the zeolite and calculated as the metal.

In some embodiments, the zeolite is an aluminosilicate zeolite having a silica-to-alumina ratio (SAR) of from about 5 to about 100. In some embodiments, the aluminosilicate zeolite has a SAR of from about 10 to about 40.

In some embodiments, the zeolite has a framework structure type selected from the group consisting of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof. In some embodiments, zeolite has a framework structure type selected from the group consisting of BEA, CHA, FER, MFI, and FAU. In some embodiments, the zeolite is selected from the group consisting of beta zeolite, chabazite, ferrierite, mordenite, ZSM-5, and zeolite Y. In some embodiments, the zeolite is ferrierite.

In some embodiments, the LT-NA composition adsorbs $NO_x$ components from an exhaust gas stream at a temperature of from about 30° C. to about 200° C., and in an amount of at least 30-100% of the theoretical amount based on a 1:1 mole ratio of $NO_x/Pd$, based on the total amount of $NO_x$ present in the exhaust gas stream.

In some embodiments, the LT-NA composition releases $NO_x$ components back into the exhaust gas stream at a temperature of from about 170° C. to about 400° C., and in an amount of at least 50 to about 100% by weight, based on the total amount of $NO_x$ components adsorbed onto the LT-NA composition.

In some embodiments, the LT-NA composition has a first $NO_x$ adsorption capacity value, and after hydrothermal aging at 750° C. for a period of 2-80 hours, has a second $NO_x$ adsorption capacity value; wherein the second $NO_x$ adsorption capacity value is equal to or greater than the first $NO_x$ adsorption capacity value. In some embodiments, the second $NO_x$ adsorption capacity is enhanced relative to a LT-NA composition comprising a zeolite comprising a first metal component, and which does not comprise a second metal component.

In another aspect is provided an LT-NA article for treating an exhaust stream of an internal combustion engine, the catalyst article comprising a substrate having an inlet end and an outlet end defining an overall length; and a first washcoat comprising the LT-NA composition as disclosed herein disposed on at least a portion thereof.

In some embodiments, the LT-NA article further comprises a second washcoat comprising a diesel oxidation catalyst (DOC) composition disposed on at least a portion of the substrate. In some embodiments, the DOC composition comprises a platinum group metal (PGM) component supported on one or more refractory metal oxide support materials. In some embodiments, the PGM component comprises platinum and palladium. In some embodiments, the refractory metal oxide support material is gamma alumina or alumina doped with about 2% to about 10% $SiO_2$. In some embodiments, the DOC composition further comprises beta zeolite which is substantially free of any PGM species.

In some embodiments, the first and second washcoats are present in a layered configuration, wherein the first washcoat is disposed directly on the substrate, and the second washcoat is disposed on at least a portion of the first washcoat. In some embodiments, the first and second washcoats are present in a layered configuration, wherein the second washcoat is disposed directly on the substrate and the first washcoat is disposed on at least a portion of the second washcoat. In some embodiments, the first washcoat and the second washcoat are combined and disposed on the substrate in a single homogenous layer. In some embodiments, the first and second washcoats are present in a zoned configuration, wherein the first washcoat is disposed on the catalyst substrate from the inlet end to a length from about 10% to about 70% of the overall length; and wherein the second washcoat is disposed on the catalyst substrate from the outlet end to a length from about 30 to about 90% of the overall length.

In some embodiments, the substrate comprises a honeycomb substrate in the form of a wall-flow filter or a flow-through substrate.

In another aspect is provided an exhaust gas treatment system comprising the LT-NA article as disclosed herein, disposed downstream of and in fluid communication with an internal combustion engine.

In some embodiments, the exhaust gas treatment system further comprises one or more of a lean NOx trap (LNT), a selective catalytic reduction (SCR) catalyst, an ammonia or ammonia precursor injection component, a catalyzed soot filter (CSF), or an ammonia oxidation (AMOx) catalyst.

In another aspect is provided a method for reducing a $NO_x$ level in an exhaust gas stream from an internal combustion engine, the method comprising contacting the exhaust gas stream with the LT-NA article as disclosed herein, or the exhaust gas treatment system as disclosed herein. In some embodiments, the contacting comprises continually passing the exhaust gas stream into contact with the LT-NA article, the exhaust gas stream being at an initial temperature at or below about 150° C. and progressively warming during further engine operation; adsorbing and storing the $NO_x$ from the exhaust gas stream until the exhaust gas stream reaches a predetermined temperature, wherein the $NO_x$ is released into the exhaust gas stream exiting the LT-NA article and continually passing the exhaust gas stream exiting the LT-NA article into contact with at least one downstream catalytic material for removal of $NO_x$ components as the exhaust gas stream increases in temperature and heats each such downstream catalytic material to an operating temperature of between about 200° C. and about 450° C.

In another aspect is provided a method for modulating one or both of a $NO_x$ adsorption/desorption profile of a LT-NA composition and a $NO_x$ desorption temperature range of a LT-NA composition, the LT-NA composition comprising a zeolite comprising a first metal component and a second metal component, wherein the first metal component includes palladium, and the second metal component is selected from the group consisting of an alkaline earth metal component, an oxide of an alkaline earth metal component, a rare earth metal component, an oxide of a rare earth metal component, and a combination thereof, the method comprising selecting the second metal component and the loading thereof. In some embodiments, the $NO_x$ desorption temperature range is from about 150, about 175, about 200, about 225, or about 250, to about 275, about 300, about 325, about 350, or about 400° C.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIG. 11 shows the effect of La concentration on zeolite FER in which the optimum effect on $NO_x$ adsorption capacity is reach around 1.4% La; higher La concentration slightly increases the amount of $NO_x$ desorbed during 1200-1600 second.

DETAILED DESCRIPTION OF THE INVENTION

Figure 1A:
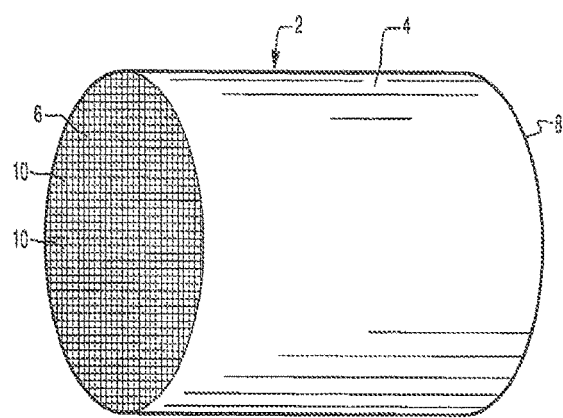
FIG. 1A is a perspective view of a honeycomb-type substrate which may comprise a catalyst (i.e., low-temperature NOx adsorber) washcoat composition in accordance with the present disclosure.

The present disclosure generally provides compositions, articles and exhaust gas treatment systems comprising such articles suitable for the adsorption and subsequent thermal release of $NO_x$. In particular, such articles and systems comprise a $NO_x$ adsorber composition suitable for adsorbing $NO_x$ at low temperatures (a LT-NA) and thermally releasing trapped $NO_x$ at elevated temperatures. This is of particular importance, for example, when the LT-NA article is placed upstream of a selective catalytic reduction (SCR) catalyst component that is very effective in converting $NO_x$ to $N_2$ at temperatures above 200° C., but does not exhibit sufficient activity at lower temperature regions (<200° C.), such as during cold-start and before urea can be injected into the exhaust.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, 10%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The term "abatement" means a decrease in the amount, caused by any means.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

"Average particle size" is synonymous with D50, meaning half of the population of particles has a particle size above this point, and half below. Particle size refers to primary particles. Particle size may be measured by laser light scattering techniques, with dispersions or dry powders, for example according to ASTM method D4464. D90 particle size distribution indicates that 90% of the particles (by number) have a Feret diameter below a certain size as measured by Scanning Electron Microscopy (SEM) or Transmission Electron Microscopy (TEM) for submicron size particles; and a particle size analyzer for the support-containing particles (micron size).

The term "catalyst" refers to a material that promotes a chemical reaction. The catalyst includes the "catalytically active species" and the "support" that carries or supports the active species. For example, zeolites may be supports for e.g., platinum group metal (PGM) or base metal active catalytic species. Likewise, refractory metal oxide particles may be a support for platinum group metal catalytic species. The catalytically active species are also termed "promoters" as they promote chemical reactions. For instance, a present PGM-containing zeolite may be termed a PGM-promoted zeolite. A "promoted zeolite" refers to a zeolite to which catalytically active species are intentionally added.

The term "catalytic article" or "catalyst article" in the disclosure means an article comprising a substrate having a catalyst coating composition.

"Crystal size" as used herein means the length of one edge of a face of the crystal, preferably the longest edge, provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of the straight edge are measured and recorded. Particles that are clearly large polycrystalline aggregates are not to be included in the measurements. Based on these measurements, the arithmetic mean of the sample crystal sizes is calculated.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. An SCR catalyst composition can also coated directly onto a wall-flow filter, which is called SCRoF.

As used herein, the phrase "catalyst system" refers to a combination of two or more catalysts or articles, for example, a combination of a low-temperature $NO_x$ adsorber (LT-NA) and a second catalyst which may be a DOC, a LNT or a SCR catalyst article. The catalyst system may alternatively be in the form of a washcoat in which the two catalysts are mixed together or coated in separate layers The term "configured" as used in the description and claims is intended to be an open-ended term as are the terms "comprising" or "containing." The term "configured" is not meant to exclude other possible articles or elements. The term "configured" may be equivalent to "adapted."

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; a zeolite for HC storage; and optionally, promoters and/or stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to about 200 $m^2/g$ or higher. Such activated alumina can also be a mixture of the gamma and delta phases of alumina, but may also contain substantial amounts of eta, kappa and theta alumina phases.

As used herein, "impregnated" or "impregnation" refers to permeation of the catalytic material into the porous structure of the support material.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

The term "functional article" in the invention means an article comprising a substrate having a functional coating composition disposed thereon, in particular a catalyst and/or adsorbent coating composition.

As used herein, "impregnated" or "impregnation" refers to permeation of the catalytic material into the porous structure of the support material.

"LNT" refers to a lean $NO_x$ trap, which is a catalyst containing a platinum group metal, a rare earth metal oxide, and an alkaline earth metal trap material suitable to adsorb $NO_x$ during lean conditions (for example, BaO or MgO). Under rich conditions, $NO_x$ is released and reduced to nitrogen.

As used herein, the term "molecular sieves," such as zeolites and other zeolitic framework materials (e.g. isomorphously substituted materials), refers to materials that may, in particulate form, support catalytic PGMs or other catalytic metals. Molecular sieves are materials based on an extensive three-dimensional network of oxygen ions containing generally tetrahedral type sites and having a substantially uniform pore distribution, with the average pore size being no larger than 10 Ångstroms (Å). Molecular sieves can be differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the type and amount of cations included in the molecular sieves lattice, range from about 3 to 10 Å in diameter. Molecular sieves comprise small pore, medium pore and large pore molecular sieves or combinations thereof. The pore sizes are defined by the largest ring size.

As used herein, the terms "nitrogen oxides" or "$NO_x$" designate the oxides of nitrogen, such as NO, $NO_2$ or $N_2O$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "selective catalytic reduction" (SCR) refers to the catalytic process of reducing oxides of nitrogen to dinitrogen ($N_2$) using a nitrogenous reductant.

"Substantially free" means "little or no" or "no intentionally added" and also having only trace and/or inadvertent amounts. For instance, in certain embodiments, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. Flow-through and wall-flow substrates are also taught, for example, in International Application Publication No. WO2016/070090, which is incorporated herein by reference. A washcoat is formed by preparing a slurry containing a specified solids content (e.g., 30-90% by weight) of catalyst in a liquid, which is then coated onto a substrate and dried to provide a washcoat layer. Reference to "monolithic substrate" means a unitary structure that is homogeneous and continuous from inlet to outlet. A washcoat is formed by preparing a slurry containing a certain solid content (e.g., 20%-90% by weight) of particles in a liquid vehicle, which is then coated onto a substrate and dried to provide a washcoat layer.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. The washcoat containing the metal-promoted molecular sieve of the invention can optionally comprise a binder selected from silica, alumina, titania, zirconia, ceria, or a combination thereof. The loading of the binder is about 0.1 to 10 wt % based on the weight of the washcoat. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

"Weight percent (wt %)," if not otherwise indicated, is based on an entire composition free of any volatiles, that is, based on dry solids content. Unless otherwise indicated, all parts and percentages are by weight.

As used herein, the term "zeolite" refers to a specific example of a molecular sieve, further including silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates For the purposes of this disclosure, SAPO, AlPO, and MeAlPO materials are considered non-zeolitic molecular sieves.

A present zeolite, independently, may comprise $SiO_4$/$AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms.

Typically, any framework type of zeolite can be used, such as framework types of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DON, EAB, EDI, EEI, EMT, EON, EPI, ERI, ESV, ETR, EUO, FAU, FER, GIS, GME, GON, GOO, HEU, IFR, IFY, IHW, IRN, ISV, ITE, ITH, ITW, IWR, IWW, JBW, KFI, LAU, LEV, LOV, LTA, LTL, LTN, MAZ, MEI, MEL, MER, MFI, MFS, MON, MOR, MOZ, MTF, MTT, MTW, MWF, MWW, NAB, NAT, NES, NPO, NPT, NSI, OBW, OFF, OSI, OSO, OWE, PAR, PAU, PHI, PON, RHO, RON, RRO, RSN, RTE, RTH, RWR, RWY, SAO, SAS, SAT, SAV, SBE, SBS, SBT, SFE, SFF, SFG, SFH, SFN, SFO, SFW, SOS, SSY, STF, STI, STT, TER, THO, TON, TSC, UEI, UFI, USI, UTL, VET, VFI, VNI, VSV, WIE, WEN, YUG, ZON, or combinations thereof.

Zeolites are crystalline materials having rather uniform pore sizes which, depending upon the type of zeolite and the type and amount of cations included in the zeolite lattice, range from about 3 to 10 Ångstroms in diameter. The pore sizes are defined by the ring size. As used herein, the term "small pore" refers to pore openings which are smaller than about 5 Ångstroms, for example on the order of ~3.8 Ångstroms.

A small pore zeolite contains channels defined by up to eight tetrahedral atoms. The phrase "8-ring" zeolite refers to a zeolite having 8-ring pore openings and double-six ring secondary building units and having a cage like structure resulting from the connection of double six-ring building units by 4 rings.

Exemplary small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

A medium pore zeolite contains channels defined by ten-membered rings. Exemplary medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof.

A large pore zeolite contains channels defined by twelve-membered rings. Exemplary large pore zeolites include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof.

Unless otherwise indicated, all parts and percentages are by weight. "Weight percent (wt %)," if not otherwise indicated, is based on an entire composition free of any volatiles, that is, based on dry solids content.

All methods described herein cane performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, Pre-Grant publications and patents referred to herein are hereby incorporated by reference in their entireties.

Low Temperature NOx Adsorber (LT-NA) Compositions

The present disclosure provides an LT-NA composition comprising a zeolite having at least a first metal component and a second metal component included therewith, wherein the first metal component includes palladium, and wherein the second metal component is selected from the group consisting of an alkaline earth metal component, an oxide of an alkaline earth metal component, a rare earth metal component, an oxide of a rare earth metal component, and combinations thereof. The individual components of the LT-NA composition are further described herein below.

Zeolite As referenced above, the present LT-NA composition comprises a zeolite having at least a first metal component and a second metal component included therewith. As described herein above, the term zeolite refers to a specific example of a molecular sieve, further including silicon and aluminum atoms. According to one or more embodiments, the zeolite can be based on the framework topology by which the structures are identified. Typically, any framework type of zeolite can be used, such as framework types of ABW, ACO, AEI, AEL, AEN, AET, AFI, AFN, AFO, AFR, AFS, AFT, AFX, AFY, AHT, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof. In some embodiments, the zeolite has a framework structure type selected from the group consisting of BEA, CHA, FER, MFI, and FAU.

In some embodiments, the zeolite has a two-dimensional pore system. In some embodiments, the zeolite having the two-dimensional pore system may have a framework type such as, but not limited to, FER, CSV, DAC, HEU, MFS, MWW, NES, RRO, SFG, STI, STT, or TER. Synthesis of zeolites with the FER structure and discussion of pore geometry is disclosed in, for example, Weitkamp et al., *Chem. Eng. Technol.* 25, (2002), 3, 273-275; Pinar et al., *Proceedings of the 5$^{th}$ Serbian-Croatian-Slovenian Symposium on Zeolites*, 32-35; and Parikh et al., *Indian Journal of Chemical Technology*, 18, Sep. 2011, 335-342, each of which is incorporated herein by reference in their entirety.

In some embodiments, the zeolite is an aluminosilicate zeolite. In some embodiments, the aluminosilicate zeolite crystals have a mean crystal size (i.e., of individual crystals including twinned crystals) of greater than about 0.5 µm, preferably between about 0.1 µm and about 15 µm, for example, from about 0.5 µm to about 5 µm, about 0.7 µm to about 1.5 µm, about 1 µm to about 5 µm, or about 1 µm to about 10 µm.

In some embodiments, the zeolite is selected from the group consisting of beta zeolite, chabazite, ferrierite, mordenite, ZSM-5, and zeolite Y. In some embodiments, the zeolite is ferrierite.

The molar ratio of silica-to-alumina ("SAR") of a present zeolite can vary over a wide range, but is generally 2 or greater. For instance, a present zeolite may have a SAR of from about 5 to about 1000. In some embodiments, the zeolite has a silica-to-alumina ratio (SAR) of from about 2 to about 300, including about 5 to about 250; about 5 to about 200; about 5 to about 100; and about 5 to about 50. In one or more specific embodiments, the molecular sieve has a SAR molar ratio in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50. In one or more embodiments, the molecular sieve has a SAR molar ratio in the range of about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000. In some embodiments, the zeolite is an aluminosilicate zeolite having a SAR of from about 5 to about 100. In some embodiments, the aluminosilicate zeolite has a SAR of from about 10 to about 40. In some embodiments, the molar ratio of silica to alumina ($SiO_2:Al_2O_3$), is from about 2 to about 50. In some embodiments, the molar ratio of $SiO_2$ to $Al_2O_3$ is about 25.

Without wishing to be bound by theory, a high zeolite sodium content may negatively impact hydrothermal stability. Therefore, a low content of sodium and alkali metals in the zeolite is generally preferred. In certain embodiments, the zeolite has an alkali content of less than 3 wt %, more preferably less than 1 wt %, and even more preferably less than 0.1 wt % based on the total weight of the calcined zeolite (reported as the alkali metal oxide on a volatile-free basis). In some embodiments, low alkali content zeolites can be provided by ion exchanging sodium (Na) form zeolites to the ammonia ($NH_4$) form. $NH_4$ ion exchange into the zeolite may be carried out at room temperature or at a temperature up to about 80° C. over a period of about 1 to 24 hours. In some embodiments, the resulting zeolite material may preferably be dried at about 100 to 120° C., to afford an $NH_4$-exchanged zeolite. In some embodiments, the $NH_4$-exchanged zeolite may be calcined at a temperature of at least about 450° C. to afford an H-exchanged zeolite.

First Metal Component

As referenced above, the disclosed LT-NA composition comprises a zeolite having at least a first metal component and a second metal component included therewith, wherein the first metal component includes palladium. The term "first metal component" as used herein refers to a first metal, or ions, or compounds, for example, oxides, of the first metal. In some embodiments, the first metal includes palladium. As used herein, the term "includes palladium" means that the metal component comprises, contains, or is palladium, including palladium in the zero valent state (i.e., palladium metal), palladium ions, or compounds thereof. The disclosed LT-NA compositions may be described as comprising a zeolite "comprising" palladium (or as comprising palladium "associated with" the zeolite). In such instances, "comprising" (or "associated with") is understood to mean that the palladium resides either in the ion-exchange sites of the zeolite, on the surface of the zeolite, or both in the ion-exchange sites and on the surface of the zeolite.

The concentration of the first metal component can vary, but will typically be from about 0.01 wt % to about 10 wt % relative to the weight of the zeolite. Palladium may be present in the zeolite, for example, from about 0.1%, about 0.2%, about 0.5%, about 0.7%, about 0.9% or about 1.0%, to about 1.5%, about 2.0%, about 2.5%, about 3.0%, about 3.5%, about 4.0%, about 4.5%, or about 5.0% by weight, based on the total weight of the zeolite. Weights of palladium are measured and reported as the metal.

Second Metal Component

As referenced above, the disclosed LT-NA composition comprises a zeolite having at least a first metal component and a second metal component included therewith. The second metal component is selected from the group consisting of an alkaline earth metal component, an oxide of an alkaline earth metal component, a rare earth metal component, an oxide of a rare earth metal component, and combinations thereof.

In some embodiments, the second metal component is present as the metal ion, which may be present e.g., within at least a portion of the ion-exchange sites of the zeolite. In some embodiments, the second metal component is present as the metal oxide.

The quantity of the second metal component may vary. For example, present LT-NA compositions generally contain from about 0.1% to about 10%, or from about 0.5% to about 5% by weight of the second metal component based on the total weight of the zeolite (i.e., the weight of the zeolite including the first metal component, the second metal component, and any further added components). In some embodiments, the total amount of the second metal component is less than 10%, less than 9%, less than 8%, less than 7%, less than 6%, less than 5%, less than 4%, less than 3%, less than 2%, less than 1%, or less than 0.5% by weight based on the total weight of the zeolite. In some embodiments, the second metal component is present in an amount of about 0.5% by weight based on the total weight of the zeolite. In some embodiments, the second metal component is present in an amount of about 0.5%, about 1%, about 2%, about 3%, about 4%, or about 5% by weight based on the total weight of the zeolite.

In some embodiments, the second metal component is present in a ratio by weight to the first metal component of from about 0.1 to about 2, calculated as the metal oxide and the metal, respectively.

Alkaline Earth Metal Component

In some embodiments, the second metal component of the LT-NA composition as disclosed herein is an alkaline earth metal component. As used herein, the term "alkaline earth metal component" refers to an alkaline earth metal compound, complex, or the like which, upon calcination or use of the catalyst, may decompose or otherwise convert to a form such as the corresponding alkaline earth metal oxide. In some embodiments, at least a portion of the alkaline earth metal component is present as ions of the alkaline earth metal within the ion exchange sites of the zeolite. In some embodiments, at least a portion of the alkaline earth metal component is present as the alkaline earth metal oxide, disposed on or in the zeolite. As used herein, the term "alkaline earth metal" refers to Group II metals such as magnesium, calcium, strontium, and barium. In some embodiments, the alkaline earth metal component comprises barium, calcium, magnesium, strontium, or a mixture thereof. In some embodiments, the alkaline earth metal component is barium. In some embodiments, the alkaline earth metal component is strontium.

The alkaline earth metal component also comprises the oxides of an alkaline earth metal.

Rare Earth Metal Component

In some embodiments, the second metal component of the LT-NA composition as disclosed herein is a rare earth metal component. The term "rare earth metal component" refers to a rare earth metal compound, complex, or the like which, upon calcination or use of the catalyst, may decompose or otherwise convert to a form such as the corresponding rare earth metal oxide. In some embodiments, at least a portion of the rare earth metal component is present as ions of the rare earth metal within the ion exchange sites of the zeolite. In some embodiments, at least a portion of the rare earth metal component is present as the rare earth metal oxide, disposed on or in the zeolite. These oxides may include various oxidation states of the rare earth metal, such as monoxide, dioxide, trioxide, tetroxide, and the like, depending on the valence of the particular transition metal. As used herein, the term "rare earth metal" refers to metals of the lanthanide series as defined in the Periodic Table of Elements. Lanthanide series metals include cerium, praseodymium, neodymium, promethium, samarium, europium, gadolinium, terbium, dysprosium, holmium, erbium, thulium, ytterbium, and lutetium. Particularly suitable rare earth metals include one or more of lanthanum, cerium, neodymium, yttrium, praseodymium, and mixtures thereof. In some embodiments, the rare earth metal component comprises Y, Ce, La, Pr, Nd, Pm, Sm, Eu, Gd, Tb, Dy, Ho, Er, Tm, Yb, Lu, or a combination thereof. In some embodiments, the rare earth metal component is lanthanum.

While the foregoing description provides several suitable ranges or amounts for the metal components of the LT-NA composition, it should be noted that each disclosed range or amount for one of these components may be combined with a disclosed range or amount for the other components to form new ranges or sub-ranges. Such embodiments are also expressly contemplated by the invention.

The rare earth metal component also comprises the oxides of a rare earth metal.

Diesel Oxidation Catalyst (DOC) Composition

Generally, a DOC composition comprises one or more platinum group metal (PGM) components dispersed on a support, such as a refractory metal support. Various such DOC compositions are known for use in treating the exhaust of diesel engines in order to convert both hydrocarbon (HC) and carbon monoxide (CO) gaseous pollutants by catalyzing the oxidation of these pollutants to carbon dioxide and water.

The term "PGM component" refers to any component that includes a PGM (e.g., Ru, Rh, Os, Ir, Pd, Pt and/or Au). Reference to "PGM component" allows for the presence of the PGM in any valence state. For example, the PGM may be in metallic form, with zero valence, or the PGM may be in an oxide form. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the PGM component comprises palladium, platinum, rhodium, rhenium, ruthenium, iridium, or a combination thereof. In some embodiments, the PGM component comprises palladium, platinum, or a mixture thereof. In some embodiments, the PGM component is a metal or an oxide thereof (e.g., including, but not limited to, platinum or an oxide thereof).

The PGM component may be present in an amount in the range of about 0.01 to about 20% on a metal basis, based on the total weight of the DOC composition. The DOC composition may comprise, for example, a PGM component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry DOC composition. In particular embodiments, the PGM of the DOC composition disclosed herein comprises both a platinum component and a palladium component. In some embodiments, the Pt/Pd ratio of the PGM component is from about 10:1 to about 1:10. In some embodiments, the Pt/Pd weight ratio is about 2/1.

Typically, both the platinum and palladium components of the disclosed DOC composition are supported on a support material (wherein the support material on which the platinum component and the palladium component are supported can be the same or different). Support materials can be zeolitic or non-zeolitic. Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolite supports include, but are not limited to, high surface area refractory metal oxides.

The support material on which the catalytically active platinum component and second palladium component are deposited, for example, comprises a refractory metal oxide, which exhibits chemical and physical stability at high temperatures, such as the temperatures associated with gasoline or diesel engine exhaust. Exemplary refractory metal oxides include alumina, silica, zirconia, titania, ceria, praseodymia, tin oxide and the like, as well as physical mixtures or chemical combinations thereof, including atomically-doped combinations and including high surface area or activated compounds such as activated alumina. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina," typically exhibit a BET surface area in excess of 60 m$^2$/g, often up to about 200 m$^2$/g or higher. An exemplary refractory metal oxide comprises high surface area γ-alumina having a specific surface area of about 50 m$^2$/g to about 300 m$^2$/g. Such activated alumina is usually a mixture of the gamma and delta phases of alumina, but may also contain substantial amounts of eta, kappa and theta alumina phases. "BET surface area" has its usual meaning of referring to the Brunauer, Emmett, Teller method for determining surface area by N$_2$ adsorption. Desirably, the active alumina has a specific surface area of about 60 m$^2$/g to about 350 m$^2$/g, for example from about 90 m$^2$/g to about 250 m$^2$/g.

In certain embodiments, metal oxide supports useful in the DOC catalyst compositions disclosed herein are doped alumina materials, such as Si-doped alumina materials (including, but not limited to 1-10% SiO$_2$—Al$_2$O$_3$), doped titania materials, such as Si-doped titania materials (including, but not limited to 1-10% SiO$_2$—TiO$_2$) or doped zirconia materials, such as Si-doped ZrO$_2$ (including, but not limited to 5-30% SiO$_2$—ZrO$_2$).

Thus the refractory metal oxides or refractory mixed metal oxides in the DOC catalyst compositions are typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof.

The DOC catalyst composition may comprise any of the above named refractory metal oxides and in any amount. For example, refractory metal oxides in the catalyst composition may comprise at from about 15 wt. %, about 20 wt. %, about 25 wt. %, about 30 wt. % or about 35 wt. % to about 50 wt. %, about 55 wt. %, about 60 wt. % about 65 wt. % or about 70 wt. % based on the total dry weight of the DOC catalyst composition. The DOC catalyst composition may, for example, comprise from about 10 to about 99 wt. % alumina, from about 15 to about 95 wt. % alumina or from about 20 to about 85 wt. % alumina.

In some embodiments, the LT-NA composition as disclosed herein adsorbs NO$_x$ components from an exhaust gas stream at a temperature of from about 30° C. to about 200° C., for example from about 30° C., about 40° C., about 50° C., about 75° C., or about 100° C., to about 125° C., about 150° C., about 175° C., or about 200° C.

In some embodiments, the LT-NA composition as disclosed herein adsorbs NO$_x$ components from an exhaust gas stream in an amount of at least 30-100% of the theoretical amount based on a 1:1 mole ratio of NOx/Pd, based on the total amount of NO$_x$ present in the exhaust gas stream, for example, about 30%, about 35%, about 40%, about 45%, about 50%, about 55%, about 60%, about 70%, about 75%, about 80%, about 85%, about 90%, about 95%, about 96%, about 97%, about 98%, about 99%, or about 100% of the theoretical amount.

In some embodiments, the LT-NA composition as disclosed herein releases NO$_x$ components back into the exhaust gas stream at a temperature of from about 170° C. to about 300° C., for example, from about 170° C., about 180° C., about 190° C., about 200° C., or about 225° C., to about 250° C., about 275° C., or about 300° C.

In some embodiments, the LT-NA composition as disclosed herein in releases NO$_x$ components back into the exhaust gas stream in an amount of at least 55 to about 100% by weight, based on the total amount of NO$_x$ components adsorbed onto the LT-NA composition, for example, about 55%, about 60%, about 65%, about 70%, about 75%, about 80%, about 85%, about 90%, about 95%, or about 100% by weight.

In some embodiments, the catalyst composition is fresh. In other embodiments, the catalyst composition has been aged. By "aged" it is meant that the composition, or an article comprising such composition, has been exposed to an elevated temperature for an extended period of time, simulating conditions to which the compositions would be exposed during use in a vehicle exhaust treatment system. Such aging may be referred to as "hydrothermal aging."

In some embodiments, the LT-NA composition as disclosed herein has a first NO$_x$ adsorption capacity value, and after hydrothermal aging at 750° C. for a period of 2-80 hours, has a second NO$_x$ adsorption capacity value; wherein the second NO$_x$ adsorption capacity value is equal to or greater than the first NO$_x$ adsorption capacity value. A comparison of the first and second adsorption capacities provides an indication of stability under vehicle application conditions. In some embodiments, the LT-NA composition as disclosed herein has a enhanced NOx adsorption capacity after such hydrothermal aging (i.e., the second adsorption capacity is greater than the first adsorption capacity). Surprisingly, it has been found that, in some embodiments, the second NO$_x$ adsorption capacity of LT-NA composition as disclosed herein is enhanced relative to a LT-NA composition comprising a zeolite comprising a first metal component, and which does not comprise a second metal component. Without wishing to be bound by any theory or principle, it is believed that the presence of the second metal component serves to stabilize and promote the activity of the zeolite containing the first metal component.

Preparation of Catalytic Compositions

The disclosed LT-NA catalyst and DOC compositions may, in some embodiments, be prepared via an incipient wetness impregnation method. Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support (e.g., zeolite or refractory metal oxide) containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The maximum loading is limited by the solubility of the precursor in the solution. The concentration profile of the impregnated material depends on the mass transfer conditions within the pores during impregnation and drying. One of skill in the art will recognize other methods for loading the metal components into the supports of the present compositions, for example, adsorption, ion-exchange, precipitation, and the like.

For example, palladium may be impregnated on a zeolite in the preparation of components of the LT-NA catalyst composition. Palladium salts useful for introduction of palladium to the zeolite include, but are not limited to, nitrate salts.

In some embodiments, the first metal component, the second metal component, or both, are ion-exchanged in the zeolite. Ion exchange is a process commonly used for exchanging ions residing in a porous support with an outside metal ion of interest. The zeolite framework contains open voids in the form of channels and cages which are normally occupied by water molecules and extra-skeletal cations which can be replaced. An aluminum atom attracts an excess negative charge which is compensated for by these cations. The interior of the pore system is represented by the catalytically active surface. The more aluminum and the less silicon a zeolite contains, the denser is the negative charge in its lattice and the more polar its inner surface.

Because of the presence of 2- or 3-valent cations as tetrahedron centers in the zeolite skeleton, the zeolite receives a negative charge in the form of so-called anion sites in whose vicinity the corresponding cation positions are located. The negative charge is compensated for by incorporating cations, e.g. metal cations, into the pores of the zeolite material. Cations that balance the charge of the anionic framework are loosely associated with the framework oxygens, and the remaining pore volume is filled with water molecules. The non-framework cations are generally exchangeable, and the water molecules removable. These voids and channels are characteristic for each zeolite. The term "exchange sites" refers to sites available for cations, which are mainly occupied by ion-exchanged metal cations, which are intentionally added to the zeolite (e.g., palladium).

For example, zeolites prepared with sodium or $NH_4^+$ ions residing in the pores can be exchanged with e.g., palladium ions to form a palladium ion-exchanged zeolite. This is accomplished by preparing a slurry of the zeolite in a solution containing the palladium ion. Heat may be optionally applied during this process. The palladium ion can now diffuse into the pores of the zeolite and exchange with the residing ions, i.e., $Na^+$ or $NH_4^+$, to form the palladium ion-exchanged zeolite. By "palladium ion exchanged" it is meant that at least a portion of the ion exchange sites are occupied by palladium ions. In particular it is preferred that more than 50% of the exchangeable sites are exchanged, and preferably, more than 70% of the exchangeable sites are exchanged with palladium.

Similarly, for preparation of the DOC compositions as disclosed herein, generally, aqueous solutions of soluble compounds or complexes of the platinum group metals (PGMs) are used to impregnate the support material (e.g., a zeolite or refractory metal oxide). Non-limiting examples of suitable compounds include palladium nitrate, tetraammine palladium nitrate, tetraammine platinum acetate, and platinum nitrate. During the calcination steps, or at least during the initial phase of use of the composite, such compounds are converted into a catalytically active form of the metal or a compound thereof. A suitable method of preparing a DOC catalyst composition is to prepare a mixture of a solution of a desired PGM compounds (e.g., a platinum compound and/or a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like.

Catalytic Articles

In one or more embodiments, the present LT-NA compositions are disposed (coated) on a substrate to form a catalytic article (i.e., a catalytic component or catalytic article). Such articles are part of an exhaust gas treatment system (e.g., catalyst articles including, but not limited to, articles including the LT-NA compositions disclosed herein). As used herein, the terms "catalyst article," "catalytic article," "catalyst component," "catalytic component," "article," and "component" are used interchangeably and without regard to any specific catalytic activity. For example, a LT-NA article may be referred to as a catalytic article, however, without wishing to be bound by any particular theory of operation, it is recognized that such an article possesses an adsorptive rather than a catalytic function. Similarly, a "composition" and "catalyst composition" are used interchangeably herein and without regard to any specific catalytic activity.

In one aspect of the present disclosure is provided a catalyst article for treating an exhaust stream of an internal combustion engine, the catalyst article comprising a substrate having an inlet end and an outlet end defining an overall length; and a first washcoat comprising the LT-NA composition as disclosed herein disposed on at least a portion thereof. In some embodiments, the catalyst article as disclosed herein further comprises a second washcoat comprising a diesel oxidation catalyst (DOC) composition disposed on at least a portion of the substrate in a layered or zoned configuration.

To produce catalytic articles, a substrate is coated with a catalytic composition as disclosed herein (i.e., an LT-NA and/or DOC composition). The coatings are "catalytic coating compositions" or "catalytic coatings." The terms "catalyst composition" and "catalytic coating composition" are synonymous.

Coating Compositions

Coating compositions comprising the LT-NA and/or DOC compositions as disclosed herein may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehmite, gamma-alumina, or delta/theta alumina, as well as silica sol. When present, the binder is typically used in an amount of about 1-5 wt. % of the total washcoat loading. Alternatively the binder can be zirconia-based or silica-based, for example zirconium acetate, zirconia sol or silica sol. When present, the alumina binder is typically used in an amount of about 0.05 $g/in^3$ to about 1 $g/in^3$.

Substrates

Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punchouts" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith. Metallic substrates, in particular, are advantageously employed in certain embodiments in a close-coupled position, allowing for fast heat-up of the substrate and, correspondingly, fast heat up of a catalyst composition coated therein (e.g., a LT-CO oxidation catalyst composition).

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 $in^3$ to about 1200 $in^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Figure 1B:
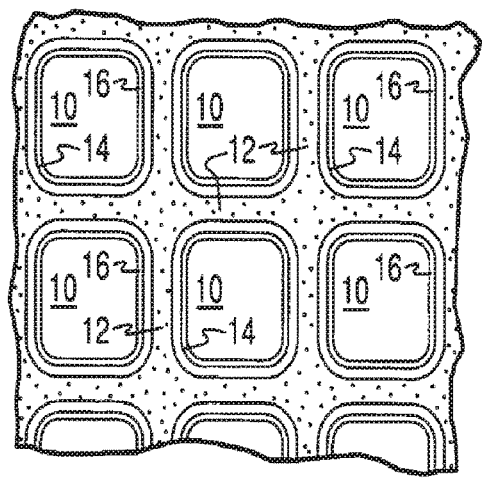
FIG. 1B is a partial cross-sectional view enlarged relative to FIG. 1A and taken along a plane parallel to the end faces of the substrate of FIG. 1A, which shows an enlarged view of a plurality of the gas flow passages shown in FIG. 1, in an embodiment wherein the substrate is a flow-through substrate.

FIGS. 1A and 1B illustrate an exemplary substrate 2 in the form of a flow-through substrate coated with a LT-NA composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1*i*, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the LT-NA composition can be applied in multiple, distinct layers if desired. In the illustrated embodiment, the LT-NA composition consists of both a discrete bottom layer 14 adhered to the walls 12 of the carrier member and a second discrete top layer 16 coated over the bottom layer 14. The present invention can be practiced with one or more (e.g., two, three, or four or more) LT-NA composition layers and is not limited to the two-layer embodiment illustrated in FIG. 1B. Further coating configurations are disclosed herein below.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes.

Figure 2:
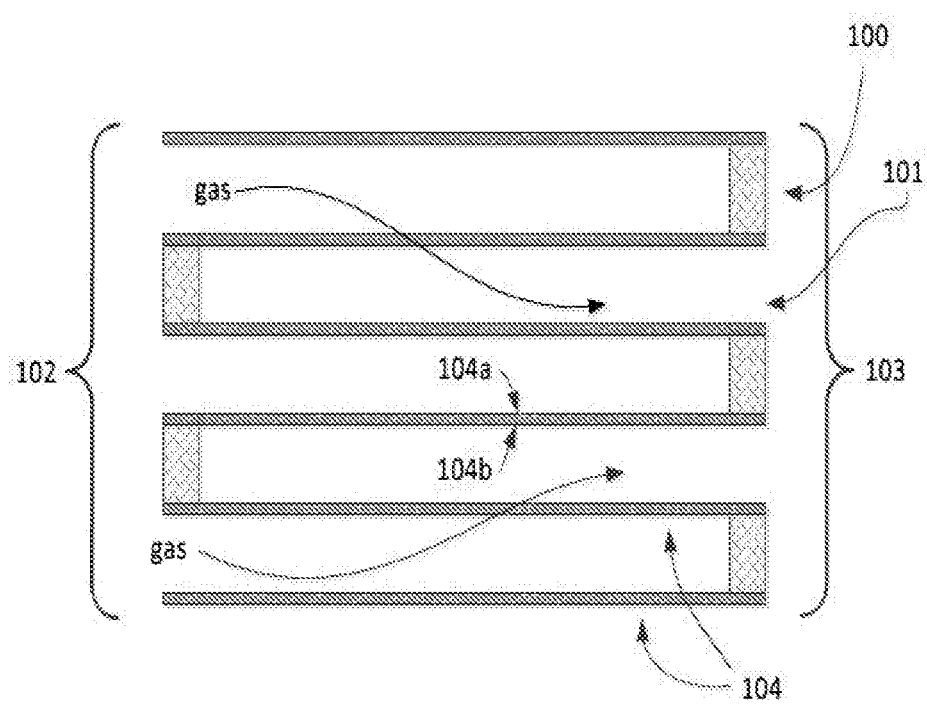
FIG. 2 is a cutaway view of a section enlarged relative to FIG. 1A, wherein the honeycomb-type substrate in FIG. 1A represents a wall-flow filter.

FIG. 2 is a perspective view of an exemplary wall-flow filter. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 $cm^3$, about 100 $cm^3$, about 200 $cm^3$, about 300 $cm^3$, about 400 $cm^3$, about 500 $cm^3$, about 600 $cm^3$, about 700 $cm^3$, about 800 $cm^3$, about 900 $cm^3$ or about 1000 $cm^3$ to about 1500 $cm^3$, about 2000 $cm^3$, about 2500 $cm^3$, about 3000 $cm^3$, about 3500 $cm^3$, about 4000 $cm^3$, about 4500 $cm^3$ or about 5000 $cm^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of >50%, >60%, >65% or >70%. For instance, the wall-flow filter article substrate will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

Coatings

A substrate is coated with a LT-NA and/or DOC composition as disclosed herein to form an article. The coating may comprise one or more thin, adherent coating layers disposed on and in adherence to least a portion of a substrate. In some embodiment, the present articles may include the use of one or more layers and combinations of one or more layers. Coating compositions may be present on the inlet side of the substrate wall alone, the outlet side alone, both the inlet and outlet sides, or the wall itself may consist all, or in part, of the coating composition The coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. The coating layer(s) may comprise the individual functional components, that is, an LT-NA composition, and/or a DOC catalyst composition each as described herein.

A catalyst composition may typically be applied in the form of a washcoat, containing support material having catalytically active species thereon. Catalyst components may also, in some embodiments, be combined in a single washcoat. A washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied. In one or more embodiments, the catalytic material(s) are applied to the substrate as a washcoat. Binders may also be employed as described above.

The above-noted catalyst composition(s) are generally independently mixed with water to form a slurry for purposes of coating a catalyst substrate, such as a honeycomb-type substrate. In addition to the catalyst particles, the slurry may optionally contain a binder (e.g., alumina, silica), water-soluble or water-dispersible stabilizers, promoters, associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of ammonium hydroxide or aqueous nitric acid.

The slurry can be milled to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a D90 particle size of about 10 to about 40 microns, preferably 10 to about 30 microns, more preferably about 10 to about 15 microns.

The slurry is then coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

The washcoat(s) can be applied such that different coating layers may be in direct contact with the substrate. Alternatively, one or more "undercoats" may be present, so that at least a portion of a catalytic or sorbent coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer. For example, one coating layer could comprise the LT-NA composition as disclosed herein, and another coating layer could comprise the DOC composition as disclosed herein. Alternatively, in some embodiments, the LT-NA composition and the DOC composition, each as disclosed herein, may be combined and applied to a substrate as a single homogenous layer. In a further embodiment, the LT-NA composition may be present in one layer, and the DOC composition components may be divided among one or more additional layers.

Thus, discussion related to different layers may correspond to any of these layers. The catalytic coating may comprise one, two or three or more coating layers. The one or more coating layers together comprise the catalytic compositions.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

In some embodiments, the first washcoat is disposed directly on the substrate, and the second washcoat is disposed on at least a portion of the first washcoat. In some embodiments, the second washcoat is disposed directly on the substrate and the first washcoat is disposed on at least a portion of the second washcoat. In some embodiments, the first and second washcoat compositions are combined and disposed on the substrate as a single homogenous layer. In some embodiments, the catalyst article has a zoned configuration, wherein the first washcoat is disposed on the catalyst substrate from the inlet end to a length from about 10% to about 70% of the overall length; and wherein the second washcoat is disposed on the catalyst substrate from the outlet end to a length from about 30 to about 90% of the overall length.

Figure 3A:
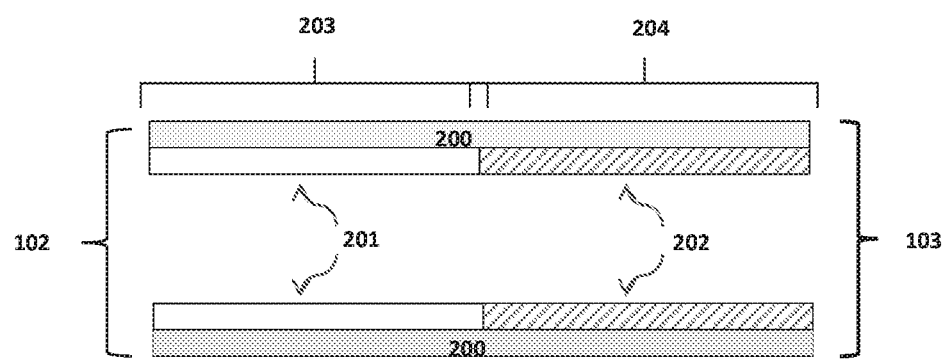
FIG. 3A is a cross-sectional view of an embodiment of a zoned catalytic article of the present disclosure.
Figure 3B:
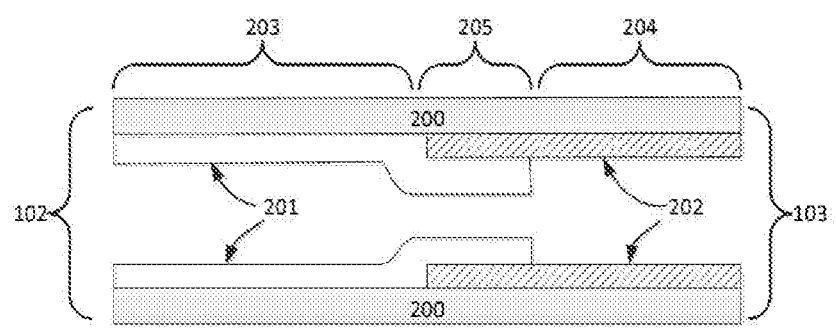
FIG. 3B is a cross-sectional view of an embodiment of a layered catalytic article of the present disclosure.
Figure 3C:
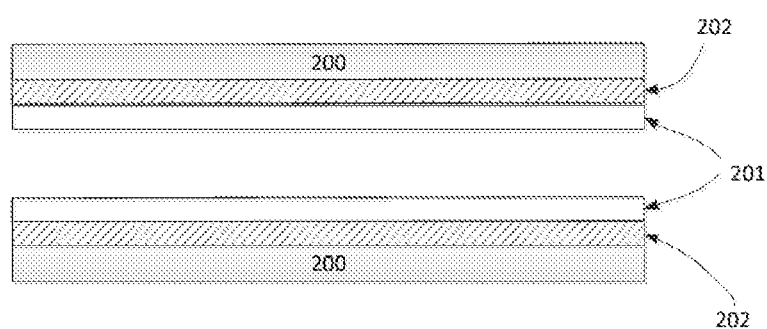
FIG. 3C is a cross-sectional view of another embodiment of a layered catalytic article of the present disclosure.

FIGS. 3A, 3B and 3C show some possible coating layer configurations with two coating layers. Shown are monolithic wall-flow filter substrate walls 200 onto which coating layers 201 and 202 are disposed. This is a simplified illustration, and in the case of a porous wall-flow substrate, not shown are pores and coatings in adherence to pore walls and not shown are plugged ends. In FIG. 3A, coating layer 201 extends from the inlet to the outlet about 50% of the substrate length; and coating layer 202 extends from the outlet to the inlet about 50% of the substrate length and the coating layers are adjacent each other, providing an inlet upstream zone 203 and an outlet downstream zone 204. In FIG. 3B, coating layer 202 extends from the outlet about 50% of the substrate length and layer 201 extends from the inlet greater than 50% of the length and overlays a portion of layer 202, providing an upstream zone 203, a middle zone 205 and a downstream zone 204. In FIG. 3C, coating layers 201 and 202 each extend the entire length of the substrate with layer 201 overlaying layer 202. The substrate of FIG. 3C does not contain a zoned coating configuration. FIGS. 3A, 3B and 3C may be useful to illustrate coating compositions on the wall-through substrate. FIGS. 3A, 3B and 3C may further be useful to illustrate coating compositions on the flow-through substrate, as described herein below. Configurations of such coating layers are not limited.

In some embodiments, the DOC composition is in a zoned configuration relative to the LT-NA composition layer(s). In some embodiments, the DOC composition may overlap one or more layers of the LT-NA composition. In some embodiments, the LT-NA catalyst composition and the DOC composition are present on a substrate in a single homogenous layer. In some embodiments, the LT-NA catalyst composition and the DOC composition are present in separate, discrete layers. In some embodiments, the LT-NA catalyst composition and the DOC composition are present in a zoned configuration. In some embodiments, other catalytic compositions can be incorporated on, under, or between any of the LT-NA and DOC catalyst composition layers referenced herein.

Loading of the present catalytic coatings (e.g., LT-NA and/or DOC) on a substrate will depend on substrate properties such as porosity and wall thickness. Typically, wall-flow filter catalyst loading will be lower than catalyst loadings on a flow-through substrate. Catalyzed wall-flow filters are disclosed, for instance, in U.S. Pat. No. 7,229,597, which is incorporated herein by reference in its entirety. The present LT-NA and/or DOC catalyst compositions are generally present on the substrate at a concentration of, for instance, from about 0.3 to 5.5 $g/in^3$, or from about 0.4 $g/in^3$, about 0.5 $g/in^3$, about 0.6 $g/in^3$, about 0.7 $g/in^3$, about 0.8 $g/in^3$, about 0.9 $g/in^3$ or about 1.0 $g/in^3$ to about 1.5 $g/in^3$, about 2.0 $g/in^3$, about 2.5 $g/in^3$, about 3.0 $g/in^3$, about 3.5 $g/in^3$, about 4.0 $g/in^3$, about 4.5 $g/in^3$, about 5.0 $g/in^3$ or about 5.5 $g/in^3$, based on the substrate. Concentration of a catalyst composition, or any other component, on a substrate refers to concentration per any one three-dimensional section or zone, for instance any cross-section of a substrate or of the entire substrate.

In some embodiments, the catalytic article comprises the first metal component at a loading from about 15 $g/ft^3$ to about 200 $g/ft^3$ or from about 60 $g/ft^3$ to about 120 $g/ft^3$. In some embodiments, the LT-NA article comprises a total zeolite loading of from about 1 $g/in^3$ to about 5 $g/in^3$ or from about 2 $g/in^3$ to about 3 $g/in^3$. In some embodiments, the catalytic article comprises a silica-to-alumina ratio (SAR) of from about 5 to about 50 or about 10 to about 35.

In some embodiments, the catalyst article as disclosed herein exhibits enhanced oxidation of carbon monoxide, hydrocarbons, or both after the catalyst article is hydrothermally aged at 750° C. for a period of 80 hours, relative to the oxidation of carbon monoxide (CO), hydrocarbons (HC), or both prior to the hydrothermal aging.

In some embodiments, the enhanced oxidation of CO or HC is measured in terms of the conversion efficiency. In some embodiments, conversion efficiency is measured as a function of light-off temperature (i.e., $T_{50}$). The light-off temperature is the temperature at which the catalyst composition is able to convert 50% of hydrocarbons to carbon dioxide and water. Typically, the lower the measured light-off temperature for any given catalyst composition, the more efficient the catalyst composition is to carry out the catalytic reaction, e.g., hydrocarbon conversion. In some embodiments, conversion efficiency is measured as a function of percent conversion to $CO_2$ at a specified temperature or over a temperature range.

Exhaust Gas Treatment Systems

The present disclosure further provides an exhaust gas treatment system for reducing a $NO_x$ level in an exhaust gas stream from an internal combustion engine, the exhaust gas treatment system comprising a catalytic article as disclosed herein. In another aspect of the present invention is provided a method for reducing a $NO_x$ level in an exhaust gas stream from an internal combustion engine, the method comprising contacting the exhaust gas stream with a catalytic article as disclosed herein, or an emission treatment system as disclosed herein. The present invention therefore provides an emission treatment system that incorporates the catalytic articles described herein, such as an emission treatment system generally comprising an engine producing an exhaust gas stream and one or more catalytic articles positioned downstream from the engine in fluid communication with the exhaust gas stream. The engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The systems disclosed herein comprise a LT-NA article, which can comprise a flow-through or wall-flow filter substrate, as disclosed herein. In particular, systems comprise a LT-NA catalyst article suitable for adsorbing $NO_x$ at low temperatures and releasing trapped $NO_x$ at elevated temperatures. The $NO_x$ adsorption component of the present catalyst compositions provide desirable $NO_x$ adsorption and desorption properties under various engine operating conditions.

Preferably, the LT-NA catalyst article is capable of adsorbing a significant portion of the $NO_x$ present in the exhaust gas stream. More importantly however, the LT-NA catalyst article does not release $NO_x$ species until the exhaust gas stream and/or the exhaust gas emission system has reached a temperature high enough for other catalytic components to be active. Only then can the released $NO_x$ be converted efficiently to $N_2$ and exit the exhaust gas treatment system. As such the LT-NA catalyst article is generally located upstream of any catalytic components responsible for the conversion of $NO_x$ released from the LT-NA. In some embodiments, the LT-NA catalyst article adsorbs $NO_x$ species present in the exhaust gas stream at low temperatures, which may have optionally been treated with at least a DOC and/or CSF component.

In some embodiments, the LT-NA catalyst article is not located in a separate component (e.g., on a separate substrate) but can be included in the same component, such as the diesel oxidation catalyst (DOC), catalyzed soot filter (CSF), or catalytic selective reduction (SCR) catalyst component, wherein the catalytic compositions for such components are applied to the substrate in a zoned or layered configuration. In some embodiments, the LT-NA and the (DOC) are combined in a single catalyst article.

Systems of the present disclosure can contain, in addition to the LT-NA catalyst article, for example, a DOC, a reductant injector, SCR catalyst component, a soot filter (which can be catalyzed or uncatalyzed), and/or an ammonia oxidation catalyst (AMOx). A suitable DOC for use in the emission treatment system is able to effectively catalyze the oxidation of CO and HC to carbon dioxide ($CO_2$). Preferably, the DOC is capable of converting at least 50% of the CO or HC component present in the exhaust gas. The DOC may be located, for example, downstream of the LT-NA catalyst article. In some embodiments, the DOC is located upstream of an SCR catalyst component and/or soot filter.

The exhaust gas treatment system of the present disclosure may further comprise an SCR catalyst component. The SCR catalyst component may be located upstream or downstream of the DOC and/or soot filter. A suitable SCR catalyst component for use in the emission treatment system is able to effectively catalyze the reduction of the $NO_x$ exhaust component at temperatures as high as 650° C. In addition, the SCR catalyst component must be active for reduction of $NO_x$ even under conditions of low load which typically are associated with lower exhaust temperatures. Preferably, the SCR catalyst component is capable of converting at least 50% of the $NO_x$ (e.g., NO) component to $N_2$, depending on the amount of reductant added to the system. Another desirable attribute for the SCR catalyst component is that it possesses the ability to catalyze the reaction of $O_2$ with any excess $NH_3$ to form $N_2$, so that $NH_3$ is not emitted to the atmosphere. Useful SCR catalyst components used in the emission treatment system should also have thermal resistance to temperatures greater than 650° C. Such high temperatures may be encountered during regeneration of the catalyzed soot filter. Suitable SCR catalyst components are described, for instance, in U.S. Pat. Nos. 4,961,917 and 5,516,497, each of which is incorporated herein by reference in its entirety.

In some embodiments, the exhaust gas treatment system further comprises one or more of a lean NOx trap (LNT), a selective catalytic reduction (SCR) catalyst, an ammonia or ammonia precursor injection component, a catalyzed soot filter (CSF), or an ammonia oxidation (AMOx) catalyst.

Figure 4:
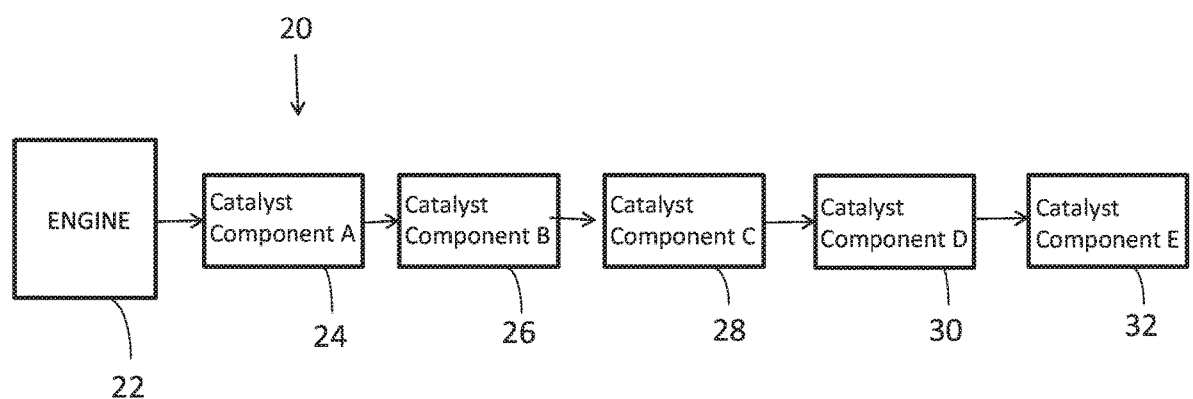
FIG. 4 is a schematic depiction of an embodiment of an exhaust gas treatment system comprising a LT-NA article of the present disclosure in combination with additional emission treatment system components.

Certain exemplified exhaust gas treatment systems may be more readily appreciated by reference to FIG. 4, which depicts a schematic representation of a non-limiting exhaust gas treatment system 20 in accordance with embodiments of the present disclosure. One of skill in the art will recognize that it may be desirable to arrange the relative position of each article in a different order than illustrated herein; such alternative ordering is contemplated by the present disclosure. As shown, the emission treatment system 20 can include a plurality of catalyst components in series downstream of an engine 22, such as a diesel engine. At least one of the catalyst components will be the LT-NA catalyst of the invention as set forth herein. The catalyst composition of the invention could be combined with numerous additional catalyst materials and could be placed at various positions in comparison to the additional catalyst materials. FIG. 4 illustrates five catalyst components, 24, 26, 28, 30, 32 in series; however, the total number of catalyst components can vary and five components is merely one example. One of skill in the art will recognize that it may be desirable to arrange the relative position of each article in a different order than illustrated herein; such alternative ordering is contemplated by the present disclosure.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

Reference to SCR in the table refers to an SCR catalyst; any suitable SCR catalyst known in the art may be utilized.

Reference to AMOx in the table refers to an ammonia oxidation catalyst, which can be provided downstream of the catalyst of one more embodiments of the invention to remove any slipped ammonia from the exhaust gas treatment system. In specific embodiments, the AMOx catalyst may comprise a PGM component. In one or more embodiments, the AMOx catalyst may comprise a bottom coat with PGM and a top coat with SCR functionality.

As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst components mounted in a position near the engine (in a close-coupled position, CC), with additional catalyst components in a position underneath the vehicle body (in an underfloor position, UF). In one or more embodiments, the exhaust gas treatment system may further comprise a urea injection component.

TABLE 1

Possible exhaust gas treatment system configurations

| Component A | Component B | Component C | Component D | Component E |
| --- | --- | --- | --- | --- |
| DOC | LT-NA | CSF | SCR | Optional AMOx |
| LT-NA | DOC | CSF | SCR | Optional AMOx |
| DOC | LT-NA | SCR | CSF | Optional AMOx |
| LT-NA | DOC | SCR | CSF | Optional AMOx |
| LT-NA/DOC | CSF | SCR | Optional AMOx | — |
| LT-NA/DOC | SCRoF | Optional AMOx | — | — |
| LT-NA/DOC | LNT | SCR | Optional AMOx | |
| DOC | LT-NA/DOC | SCR | Optional AMOx | — |
| DOC | LT-NA/DOC | LNT | SCR | Optional AMOx |

Any exemplified exhaust gas treatment system depicted by FIG. 4 may be followed by a selective ammonia oxidation catalyst (AMOx) to remove $NH_3$ released from the SCR catalyst component and selectively oxidize it to $N_2$.

Method of Treating an Exhaust Gas Stream

Aspects of the current disclosure are directed towards a method for treating a lean burn engine exhaust gas stream, the method comprising contacting the exhaust gas stream with the catalytic article of the present disclosure, or the emission treatment system of the present disclosure.

In some embodiments, the method comprises continually passing the exhaust gas stream into contact with the LT-NA catalyst article, the exhaust gas stream being at an initial temperature at or below about 150° C. and progressively warming during further engine operation; adsorbing and storing the $NO_x$ from the exhaust gas stream until the exhaust gas stream reaches a predetermined temperature, wherein the $NO_x$ is released into the exhaust gas stream exiting the LT-NA article; and continually passing the exhaust gas stream exiting the LT-NA article into contact with at least one downstream catalytic material for removal of $NO_x$ components as the exhaust gas stream increases in temperature and heats each such downstream catalytic material to an operating temperature of between about 200° C. and about 450° C.

Method of Modulating a NOx Adsorption/Desorption Profile of a LT-NA

In another aspect is provided a method for modulating one or both of a $NO_x$ adsorption/desorption profile of a LT-NA composition and a $NO_x$ desorption temperature range of a LT-NA composition, the LT-NA composition comprising a zeolite comprising a first metal component and a second metal component, wherein the first metal component includes palladium, and the second metal component is selected from the group consisting of an alkaline earth metal component, an oxide of an alkaline earth metal component, a rare earth metal component, an oxide of a rare earth metal component, and a combination thereof, the method comprising selecting the second metal component and the loading thereof. In some embodiments, the $NO_x$ desorption temperature range is from about 150, about 175, about 200, about 225, or about 250, to about 275, about 300, about 325, about 350, or about 400° C.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Preparation of Monolithic Catalyst Articles

Example 1 (Reference Article)

A zeolite Ferrierite material (FER) was incipient wetness impregnated with a diluted $Pd(NO_3)_2$ solution, then dried in air at 110° C./2 h, followed by calcination in air at 550° C. for 1 hour. A diluted Zr acetate solution was prepared, to which the calcined Pd/FER powder was added to form a slurry suspension at approximately 50% solid content. The slurry was milled until the final particle size D90 reached 10-12 μm. The slurry was then coated at 42-46% solid content onto a 400/4 honeycomb substrate. After drying, the catalyst was calcined at 590° C. for 1 hour in air. The Pd loading was 80 g/ft$^3$, the zeolite washcoat loading was 2.5 g/in$^3$, the resulting $ZrO_2$ loading after calcination was ~ 5% of the washcoat composition.

Example 2

A zeolite Ferrierite material (FER) was incipient wetness impregnated with a solution of a $Ba(OAc)_2$, then dried (110° C./2 h) and calcined (590° C./4 h) in air. The Ba weight percent varied in the range of 0.45-1.5%. The resulting Ba-FER material was further impregnated with $Pd(NO_3)_2$ solution, then dried in air at 110° C./2 h, followed with calcination in air at 550° C. for 1 hour. A diluted Zr acetate solution was prepared, to which the calcined Pd/BEA powder was added to form a slurry suspension at approximately 50% solid content. The slurry was milled until the final particle size D90 reached 10-12 m. The slurry was then coated at 42-46% solid content onto a 400/4 honeycomb substrate. After drying, the catalyst was calcined at 590° C. for 1 hour in air. The Pd loading was 80 g/ft$^3$, the zeolite washcoat loading was 2.5 g/in$^3$.

Example 3

A zeolite Ferrierite material (FER) was incipient wetness impregnated with a solution of a $Sr(OAc)_2$, then dried (110° C./2 h) and calcined (590° C./4 h) in air. The Sr weight percent based on FER was ~ 1%. The resulting Sr-FER material was further impregnated with $Pd(NO_3)_2$ solution, then dried in air at 110° C./2 h, followed with calcination in air at 550° C. for 1 hour. A diluted Zr acetate solution was prepared, to which the calcined Pd/BEA powder was added to form a slurry suspension at approximately 50% solid content. The slurry was milled until the final particle size D90 reached 10-12 m. The slurry was then coated at 42-46% solid content onto a 400/4 honeycomb substrate. After drying, the catalyst was calcined at 590° C. for 1 hour in air. The Pd loading was 80 g/ft$^3$, the zeolite washcoat loading was 2.5 g/in$^3$.

Example 4

A zeolite Ferrierite material (FER) was incipient wetness impregnated with a solution of a $La(NO_3)_3$, then dried (110° C./2 h) and calcined (590° C./4 h) in air. The La weight percent based on FER was ~ 1.3%. The resulting La-FER material was further impregnated with $Pd(NO_3)_2$ solution, then dried in air at 110° C./2 h, followed with calcination in air at 550° C. for 1 hour. A diluted Zr acetate solution was prepared, to which the calcined Pd/BEA powder was added to form a slurry suspension at approximately 50% solid content. The slurry was milled until the final particle size D90 reached 10-12 m. The slurry was then coated at 42-46% solid content onto a 400/4 honeycomb substrate. After drying, the catalyst was calcined at 590° C. for 1 hour in air. The Pd loading was 80 g/ft$^3$, the zeolite washcoat loading was 2.5 g/in$^3$.

Example 5 (LT-NA/DOC, Reference)

A LT-NA bottom layer was prepared similarly to Example 1. For the DOC top layer, a 5% $SiO_2$—$Al_2O_3$ material was incipient wetness impregnated with a diluted Pt-amine complex solution, then added to a diluted Pd nitrate solution to form a slurry suspension. The pH of the slurry suspension was adjusted to 4-5 with diluted $HNO_3$. The slurry was milled to D90=12-15 μm, then beta zeolite and an alumina binder material (3.5% of the total washcoat solid) were added. The slurry was then coated at 25-30% solid content onto the LT-NA bottom layer. After drying, the sample was calcined at 590° C. for 1 hour in air. The Si-alumina loading was 0.75 g/in$^3$, Beta zeolite loading was 0.35 g/in$^3$, the PGM loading was 36 g/ft$^3$, and Pt/Pd weight ratio was 1/2.

Example 6 (LT-NA/DOC, with Ba)

A LT-NA bottom layer was prepared similarly to Example 2. The DOC layer was prepared similarly as in Example 5.

Example 7 (LT-NA/DOC, with Si)

A LT-NA bottom layer was prepared similarly to Example 3. The DOC layer was prepared similarly as in Example 5.

Example 8 (LT-NA/DOC, with La)

A LT-NA bottom layer was prepared similarly to Example 4. The DOC layer was prepared similarly as in Example 5.

Example 9. Monolithic Catalyst Article Evaluation

The monolith catalyst articles were tested on a diesel vehicle simulator for both steady state and transient tests. The gas mixture in steady state tests consisted of 100 ppm NO, 250 ppm $C_2H_4$, 500 ppm CO, 5% $H_2O$, 10% $O_2$, 5% $CO_2$ in balancing $N_2$. The catalyst dimension was 1×1×3", and space velocity was kept constant at 30,000 $h^{-1}$. The catalyst was first treated at 500° C./5 minute in $O_2/H_2O/CO_2/N_2$ mixture, then subject to 10-minute adsorption at 100° C. in the full mixture; desorption was carried out from 100° C. to 500° C. in the $O_2/H_2O/CO_2/N_2$ mixture at 20° C./min ramp rate. The adsorption-desorption test was carried out 3 times on each article.

For transient FTP tests, the feed composition was derived from a diesel engine, and NO-only was used for the inlet $NO_x$ feed. Each catalyst was in-situ pretreated at 550° C. for 5 minutes in 10% $O_2$/5% $H_2O$/5% $CO_2/N_2$, then subject to three continuous FTP cycles. The cold-start $NO_x$ adsorption efficiency was defined as the percentage of $NO_x$ adsorbed from the start to the point when the inlet temperature first reached 200° C.

Figure 5:
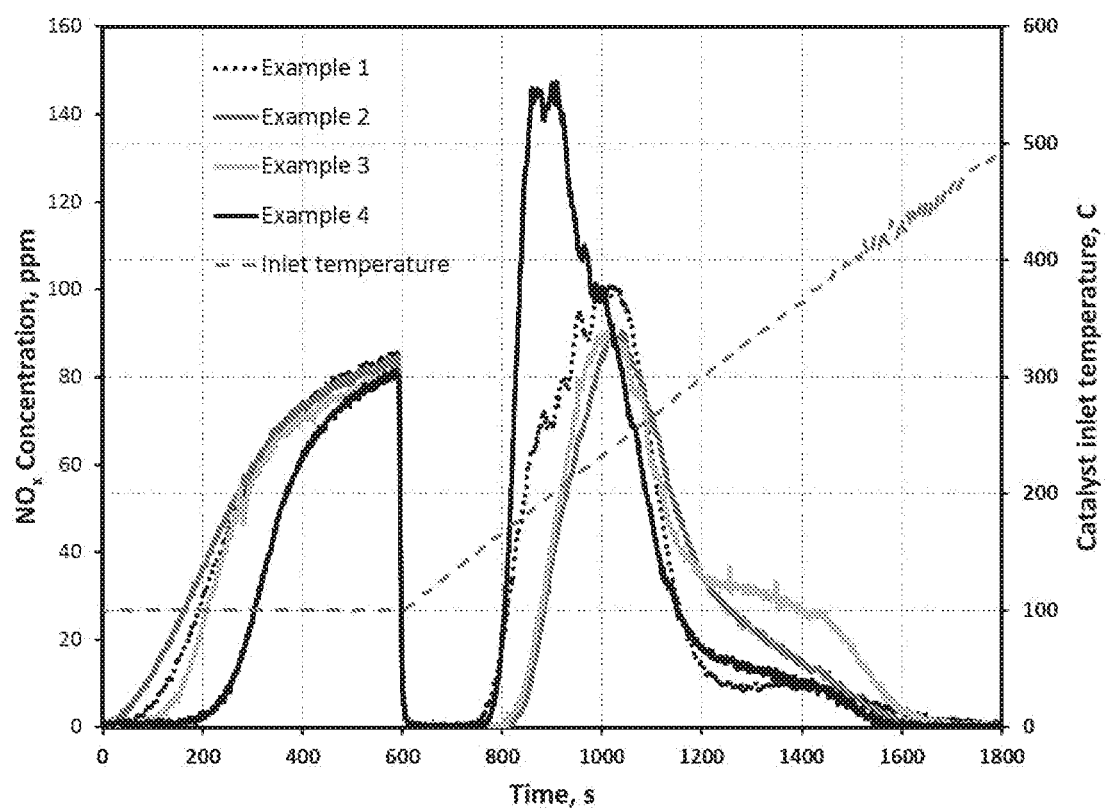
FIG. 5 is a plot of $NO_x$ adsorption and desorption versus time and temperature for embodiments of the present disclosure.

The adsorption-desorption profiles for hydrothermally aged (750° C./80 h) Examples 1-4 are illustrated in FIG. 5. Example 2 (+Ba) and Example 3 (+Sr) showed similar $NO_x$ adsorption activity to the reference article (Example 1). During desorption, Examples 2 & 3 shifted the initial $NO_x$ desorption to higher temperature, and a second desorption peak at ~1400 second (365° C.) became higher in intensity. Without wishing to be bound by theory, these observations suggest that Ba and Sr do not impact $NO_x$ adsorption significantly, instead shifting $NO_x$ desorption to a higher temperature range. Example 4 (+La) showed both higher adsorption and higher desorption $NO_x$ capacity than reference Example 1, without significantly altering the desorption temperature.

Figure 6:
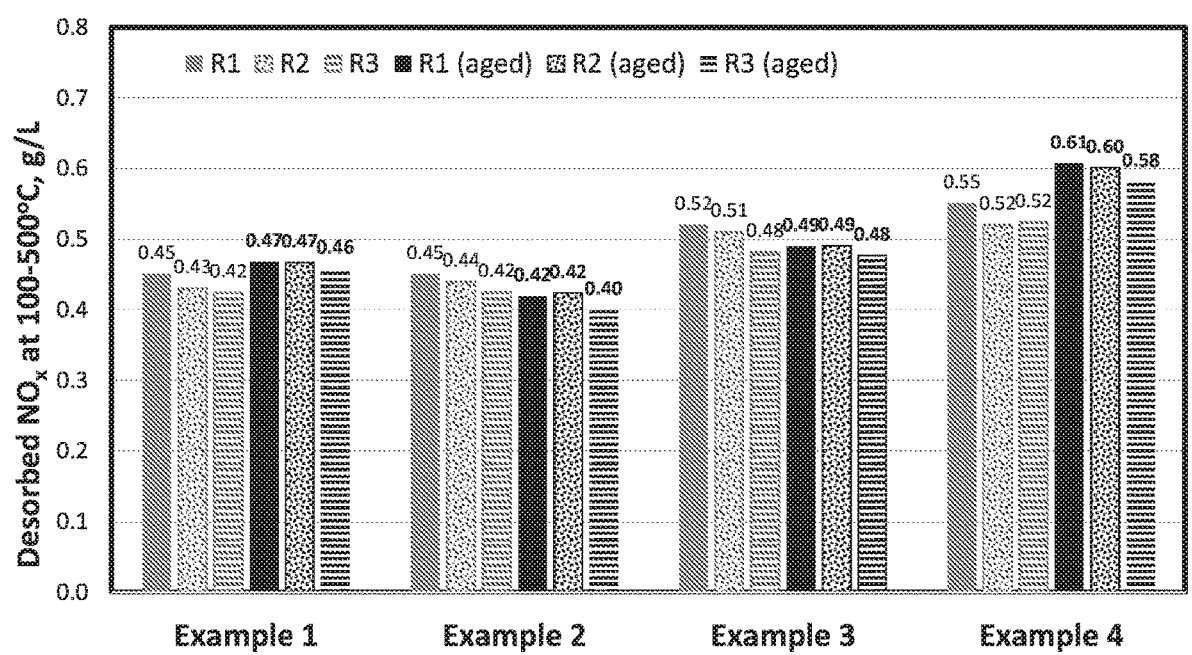
FIG. 6 is a bar graph illustrating the $NO_x$ desorption capacity for embodiments of the present disclosure.

The desorbed $NO_x$ amount for both degreened (800° C./2 h calcined in air) and hydrothermally aged (750° C./80 h) Examples 1-4 was compared over three consecutive cycles (FIG. 6). Example 4 showed higher $NO_x$ capacity after both degreening and aging. Without wishing to be bound by theory, this observation suggests that La increases the number of ion-exchanged Pd sites as well as preserves these sites during aging.

Figure 7:
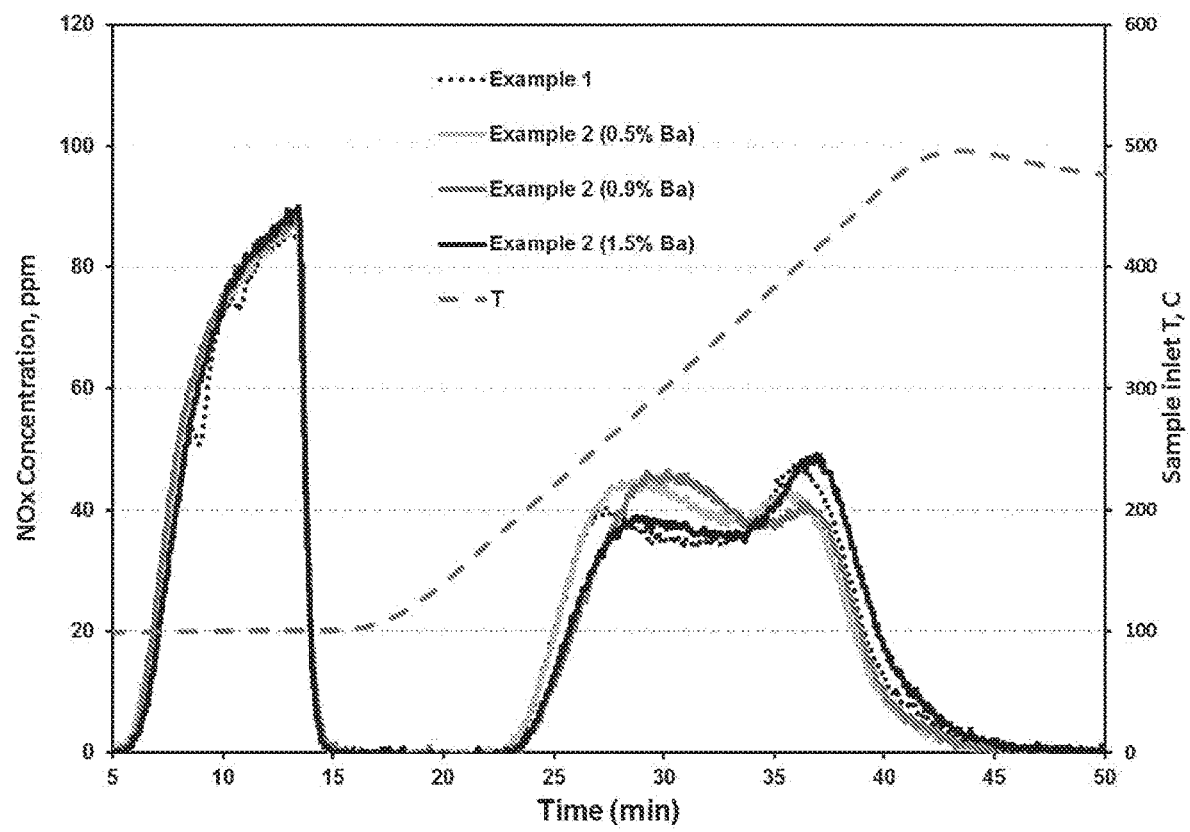
FIG. 7 is a plot of $NO_x$ adsorption and desorption versus time and temperature for embodiments of the present disclosure.

Data in FIG. 7 show that the Ba concentration in the range of 0.5-1.5% did not affect $NO_x$ adsorption, and increasing Ba concentration gradually shifted $NO_x$ desorption to a higher temperature.

Figure 8:
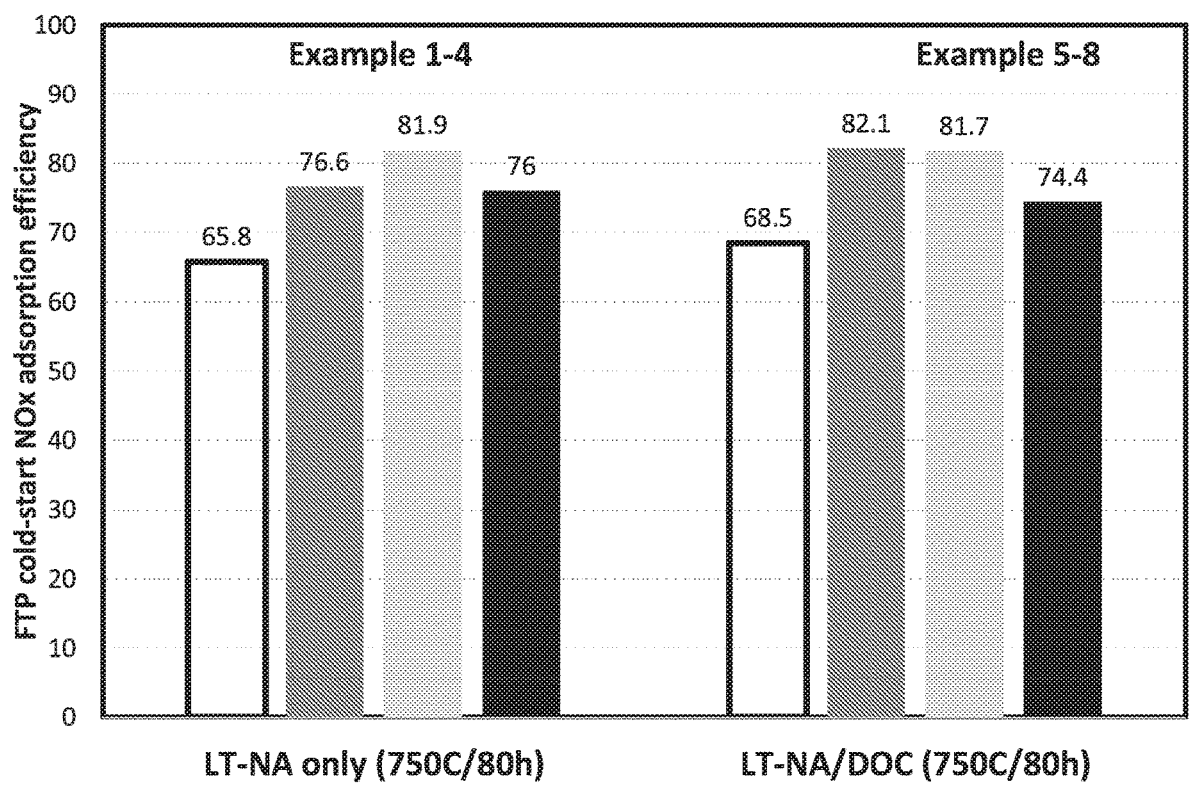
FIG. 8 is a bar graph illustrating the $NO_x$ adsorption efficiency during FTP cold-start conditions for embodiments of the present disclosure.

The $NO_x$ adsorption efficiency during FTP cold-start for aged LT-NA-only catalysts (Examples 1-4) and LT-NA/DOC combination catalysts (Example 5-8) is provided in FIG. 8. In both cases, addition of alkaline earth elements (Ba, Sr) or a rare earth element (La) demonstrated enhanced $NO_x$ adsorption activity. Without wishing to be bound by theory, it is believed that the addition of the alkaline earth elements or rare earth element better preserved the ion-exchanged Pd sites after extended hydrothermal aging.

Figure 9:
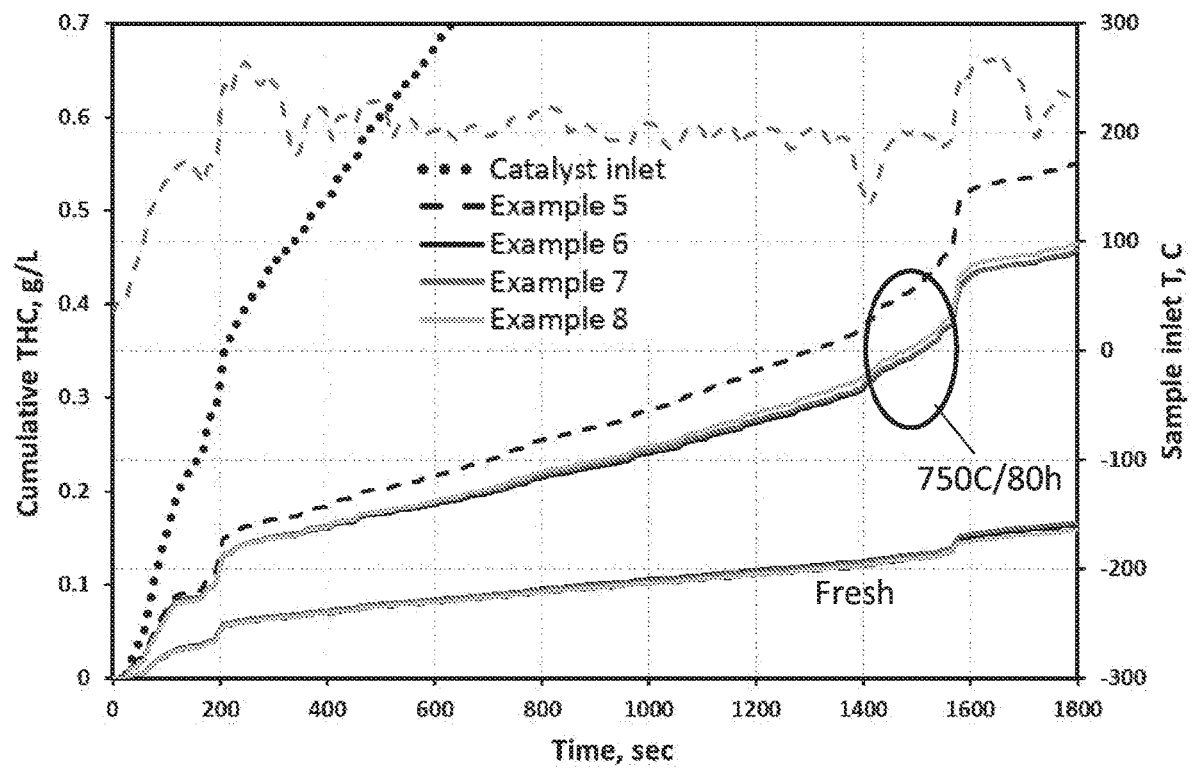
FIG. 9 is a plot of total hydrocarbon conversion versus time and temperature for embodiments of the present disclosure.

The effect of a $2^{nd}$ metal additive in LT-NA/DOC catalysts on THC conversion of FTP cycles is demonstrated in FIG. 9. The fresh catalysts showed identical THC conversion. After aging, Examples 6-8 catalyst showed improved THC conversion efficiency in FTP.

Figure 10:
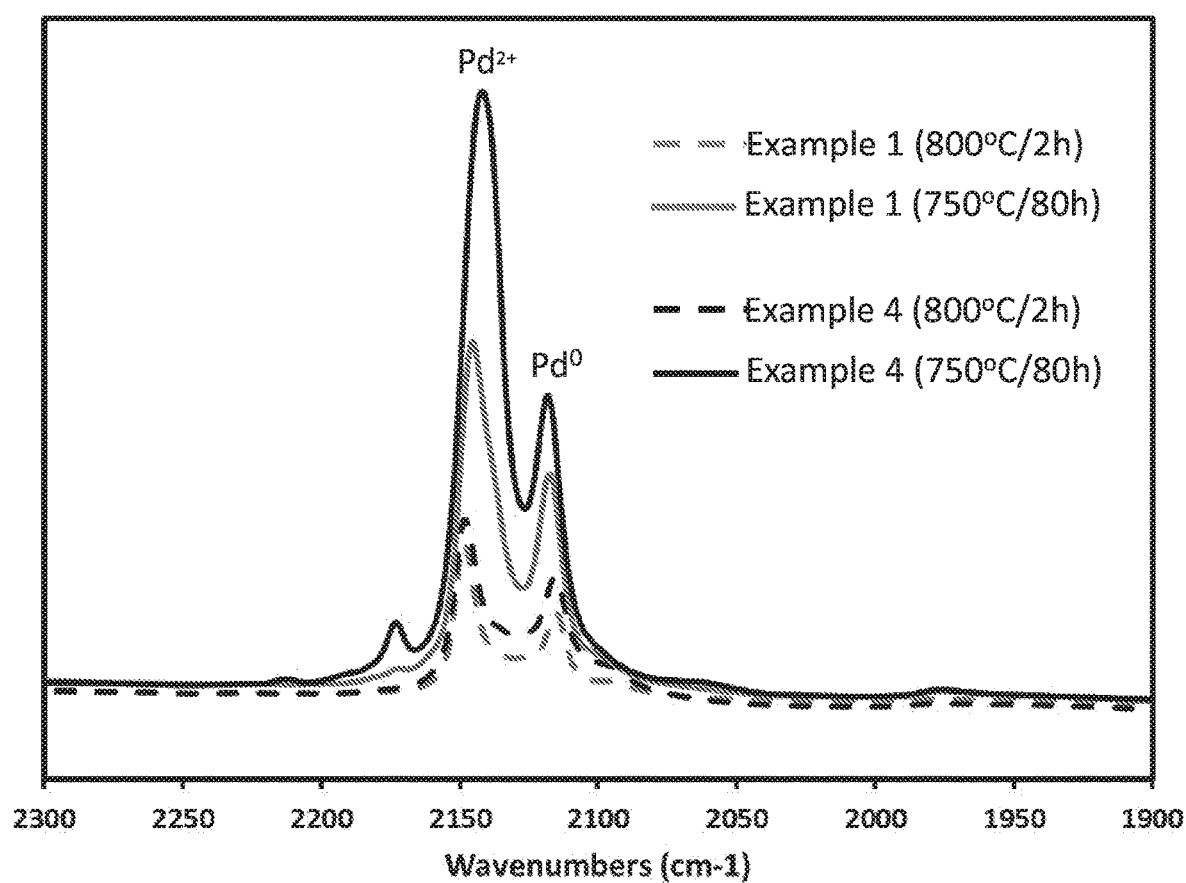
FIG. 10 is a CO-DRIFTS spectrum for embodiments of the present disclosure.

A comparison of CO-DRIFTS spectra of degreened and aged Example 4 vs reference Example 1 is provided in FIG. 10. In both cases, higher Pd signals, both ion-exchanged $Pd^{2+}$ and single Pd(0) atom, were detected in Example 4, which suggests higher Pd dispersion in the zeolite, facilitated by the addition of La.

What is claimed is:

1. A Low Temperature NOx Adsorber (LT-NA) composition comprising a zeolite having at least a first metal component and a second metal component included therewith, wherein the first metal component includes palladium, and wherein the second metal component is selected from the group consisting of an alkaline earth metal component, an oxide of an alkaline earth metal component, a rare earth metal component, an oxide of a rare earth metal component, and combinations thereof wherein more than 50% of exchange sites of the zeolite are exchanged with palladium ions.

2. The LT-NA composition of claim 1, wherein the second metal component is an alkaline earth metal component or an oxide of an alkaline earth metal component.

3. The LT-NA composition of claim 2, wherein the alkaline earth metal component comprises magnesium, calcium, strontium, barium, an oxide of magnesium, calcium, strontium, barium, or a combination thereof.

4. The LT-NA composition of claim 1, wherein the second metal component is a rare earth metal component or an oxide of a rare earth metal component.

5. The LT-NA composition of claim 4, wherein the rare earth metal component comprises Ce, La, Pr, Nd, Pm, Sm, Eu, Gd, Tb, Dy, Ho, Er, Tm, Yb, Lu, an oxide of Ce, La, Pr, Nd, Pm, Sm, Eu, Gd, Tb, Dy, Ho, Er, Tm, Yb, or Lu, or a combination thereof.

6. The LT-NA composition of claim 1, wherein the palladium is present in an amount of about 0.01% to about 10% by weight, based on the weight of the zeolite, and calculated as elemental palladium.

7. The LT-NA composition of claim 1, wherein the second metal component is present in a ratio by weight to the first metal component of from about 0.1 to about 2, calculated as the metal for the second metal component, or
wherein the second metal component is present in an amount by weight of from about 0.1% to about 10%, based on the total weight of the zeolite and calculated as the metal.

8. The LT-NA composition of claim 1, wherein the zeolite is an aluminosilicate zeolite having a silica-to-alumina ratio (SAR) of from about 5 to about 100.

9. The LT-NA composition of claim 1, wherein the zeolite has a framework structure type selected from the group consisting of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths thereof.

10. The LT-NA composition of claim 1, wherein the zeolite is selected from the group consisting of beta zeolite, chabazite, ferrierite, mordenite, ZSM-5, and zeolite Y.

11. The LT-NA composition of claim 1, wherein the LT-NA composition adsorbs NOx components from an exhaust gas stream at a temperature of from about 30° C. to about 200° C., and in an amount of at least 30-100% of the theoretical amount based on a 1:1 mole ratio of NOx/Pd, based on the total amount of NOx present in the exhaust gas stream, or
   wherein the LT-NA composition releases NOx components back into the exhaust gas stream at a temperature of from about 170° C. to about 400° C., and in an amount of at least 50 to about 100% by weight, based on the total amount of NOx components adsorbed onto the LT-NA composition.

12. The LT-NA composition of claim 1, wherein the LT-NA composition has a first NOx adsorption capacity value, and after hydrothermal aging at 750° C. for a period of 2-80 hours, has a second NOx adsorption capacity value; wherein the second NOx adsorption capacity value is equal to or greater than the first NOx adsorption capacity value, or wherein the second NOx adsorption capacity is enhanced relative to a LT-NA composition comprising a zeolite comprising a first metal component, and which does not comprise a second metal component.

13. An LT-NA article for treating an exhaust stream of an internal combustion engine, the LT-NA article comprising:
   a substrate having an inlet end and an outlet end defining an overall length; and
   a first washcoat comprising the LT-NA composition of claim 1 disposed on at least a portion thereof.

14. The LT-NA article of claim 13, further comprising a second washcoat comprising a diesel oxidation catalyst (DOC) composition disposed on at least a portion of the substrate, wherein the DOC composition comprises a platinum group metal (PGM) component supported on one or more refractory metal oxide support materials.

15. The LT-NA article of claim 14, wherein the PGM component comprises platinum and palladium.

16. The LT-NA article of claim 14, wherein the refractory metal oxide support material is gamma alumina or alumina doped with about 2% to about 10% $SiO_2$.

17. The LT-NA article of claim 14, wherein the DOC composition further comprises beta zeolite which is substantially free of any PGM species.

18. The LT-NA article of claim 14, wherein the first and second washcoats are present in a layered configuration, wherein the first washcoat is disposed directly on the substrate, and the second washcoat is disposed on at least a portion of the first washcoat, or
   wherein the first and second washcoats are present in a layered configuration, wherein the second washcoat is disposed directly on the substrate and the first washcoat is disposed on at least a portion of the second washcoat, or
   wherein the first washcoat and the second washcoat are combined and disposed on the substrate in a single homogenous layer, or
   wherein the first and second washcoats are present in a zoned configuration, wherein the first washcoat is disposed on the substrate from the inlet end to a length from about 10% to about 70% of the overall length; and wherein the second washcoat is disposed on the substrate from the outlet end to a length from about 30 to about 90% of the overall length.

19. The LT-NA article of claim 13, wherein the substrate comprises a honeycomb substrate in the form of a wall-flow filter or a flow-through substrate.

20. An exhaust gas treatment system comprising the LT-NA article of claim 13, disposed downstream of and in fluid communication with an internal combustion engine, further comprising one or more of a lean NOx trap (LNT), a selective catalytic reduction (SCR) catalyst, an ammonia or ammonia precursor injection component, a catalyzed soot filter (CSF), or an ammonia oxidation (AMOx) catalyst.

21. A method for reducing a NOx level in an exhaust gas stream from an internal combustion engine, the method comprising contacting the exhaust gas stream with the LT-NA article of claim 13, wherein the contacting comprises:
   continually passing the exhaust gas stream into contact with the LT-NA article, the exhaust gas stream being at an initial temperature at or below about 150° C. and progressively warming during further engine operation;
   adsorbing and storing the NOx from the exhaust gas stream until the exhaust gas stream reaches a predetermined temperature, wherein the NOx is released into the exhaust gas stream exiting the LT-NA article; and
   continually passing the exhaust gas stream exiting the LT-NA article into contact with at least one downstream catalytic material for removal of NOx components as the exhaust gas stream increases in temperature and heats each such downstream catalytic material to an operating temperature of between about 200° C. and about 450° C.

22. A method for modulating one or both of a NOx adsorption/desorption profile of a LT-NA composition and a NOx desorption temperature range of a LT-NA composition, the LT-NA composition comprising a zeolite comprising a first metal component and a second metal component, wherein the first metal component includes palladium, and the second metal component is selected from the group consisting of an alkaline earth metal component, an oxide of an alkaline earth metal component, a rare earth metal component, an oxide of a rare earth metal component, and a combination thereof, the method comprising selecting the second metal component and the loading thereof wherein more than 50% of exchange sites of the zeolite are exchanged with palladium ions.

23. The method of claim 22, wherein the NOx desorption temperature range is from about 150 to about 400° C.

* * * * *